United States Patent
Nader et al.

(10) Patent No.: US 12,120,638 B2
(45) Date of Patent: Oct. 15, 2024

(54) USER EQUIPMENT (UE) GROUPING CRITERIA AND MECHANISMS FOR FALSE PAGING REDUCTION

(71) Applicant: Telefonaktiebolaget LM Ericsson (publ), Stockholm (SE)

(72) Inventors: Ali Nader, Malmö (SE); Gang Zou, Lund (SE); Sina Maleki, Malmö (SE); Ilmiawan Shubhi, Malmö (SE); Andres Reial, Lomma (SE); Niklas Andgart, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 266 days.

(21) Appl. No.: 17/626,141

(22) PCT Filed: Jul. 8, 2020

(86) PCT No.: PCT/EP2020/069232
§ 371 (c)(1),
(2) Date: Jan. 11, 2022

(87) PCT Pub. No.: WO2021/018531
PCT Pub. Date: Feb. 4, 2021

(65) Prior Publication Data
US 2022/0279479 A1 Sep. 1, 2022

Related U.S. Application Data

(60) Provisional application No. 62/881,680, filed on Aug. 1, 2019.

(51) Int. Cl.
H04W 68/02 (2009.01)
H04W 72/121 (2023.01)
(Continued)

(52) U.S. Cl.
CPC ......... *H04W 68/02* (2013.01); *H04W 72/121* (2013.01); *H04W 72/1273* (2013.01); *H04W 72/23* (2023.01); *H04W 76/27* (2018.02)

(58) Field of Classification Search
CPC ..... H04W 68/02; H04W 76/27; H04W 72/23; H04W 72/121; H04W 72/1273
(Continued)

(56) References Cited

U.S. PATENT DOCUMENTS 8,520,617 B2 * 8/2013 Krishnamurthy ... H04W 72/541
370/341
8,619,685 B2 * 12/2013 Chun ..................... H04W 68/04
370/328
(Continued)

FOREIGN PATENT DOCUMENTS

AU 2011200719 A1 * 3/2011 ............. H04L 1/004
BR 112013004715 B1 * 12/2021 ........... H04B 7/0413
(Continued)

OTHER PUBLICATIONS

"3GPP TS 38.473 V15.6.0", 3rd Generation Partnership Project; Technical Specification Group Radio Access Network; NG-RAN; F1 application protocol (F1AP) (Release 15), Jul. 2019, pp. 1-220.
(Continued)

*Primary Examiner* — Melvin H Pollack
(74) *Attorney, Agent, or Firm* — Murphy, Bilak & Homiller, PLLC

(57) ABSTRACT

The present disclosure provides a method performed by a network node in a radio access network (RAN) for selective paging of a plurality of user equipments (UEs) operating in a cell served by the network node. The method comprises assigning the plurality of UEs to a plurality of paging subgroups based on one or more operating parameters of the respective UEs, wherein the paging subgroups are associ-
(Continued)

ated with a first sequence of paging occasions (POs) to which all of the UEs are assigned. The method comprises transmitting a paging indicator during a particular PO of the first sequence. The paging indicator indicates which of the paging subgroups associated with the particular PO should receive a paging message from the network node. The method further comprises transmitting the paging message within the cell.

22 Claims, 9 Drawing Sheets

(51) Int. Cl.
*H04W 72/1273* (2023.01)
*H04W 72/23* (2023.01)
*H04W 76/27* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 9,462,571 | B2* | 10/2016 | Cui | H04W 28/0226 |
| 10,080,146 | B2* | 9/2018 | Sundström | H04B 7/086 |
| 10,750,474 | B2* | 8/2020 | Basu Mallick | H04L 5/006 |
| 10,791,539 | B2* | 9/2020 | Chen | H04W 4/70 |
| 11,006,444 | B2* | 5/2021 | Yi | H04W 72/20 |
| 11,234,194 | B2* | 1/2022 | Beale | H04W 52/0229 |
| 11,317,473 | B2* | 4/2022 | Kodali | H04W 52/0241 |
| 11,343,794 | B2* | 5/2022 | Liu | H04L 12/1886 |
| 11,350,364 | B2* | 5/2022 | Sun | H04L 12/2803 |
| 11,356,976 | B2* | 6/2022 | Gonzalez | H04W 68/02 |
| 11,357,045 | B2* | 6/2022 | Chae | H04W 74/002 |
| 11,382,037 | B2* | 7/2022 | Sharma | H04W 36/08 |
| 11,395,331 | B2* | 7/2022 | Li | H04W 68/02 |
| 11,470,576 | B2* | 10/2022 | Liu | H04W 8/26 |
| 11,540,156 | B2* | 12/2022 | Marinier | H04L 5/0053 |
| 11,540,251 | B2* | 12/2022 | Shi | H04W 52/0245 |
| 11,540,320 | B2* | 12/2022 | Takeda | H04W 48/14 |
| 11,564,170 | B2* | 1/2023 | Zhang | H04W 72/23 |
| 11,576,147 | B2* | 2/2023 | Liu | H04W 68/025 |
| 11,582,712 | B2* | 2/2023 | Chen | H04W 72/23 |
| 11,711,765 | B2* | 7/2023 | Hu | H04W 68/02 370/311 |
| 11,723,106 | B2* | 8/2023 | Deenoo | H04W 76/27 370/329 |
| 11,729,614 | B2* | 8/2023 | Luft | H04W 76/15 726/5 |
| 11,751,132 | B2* | 9/2023 | Wong | H04W 68/005 370/318 |
| 11,770,769 | B2* | 9/2023 | Priyanto | H04W 52/0229 370/311 |
| 11,903,032 | B2* | 2/2024 | Ozturk | H04W 76/19 |
| 2012/0122495 | A1 | 5/2012 | Weng et al. | |
| 2015/0195774 | A1* | 7/2015 | Lee | H04W 48/12 370/312 |
| 2016/0135141 | A1* | 5/2016 | Burbidge | H04W 68/02 455/458 |
| 2016/0270028 | A1* | 9/2016 | Lee | H04W 4/70 |
| 2017/0041900 | A1 | 2/2017 | Wallentin et al. | |
| 2017/0366236 | A1* | 12/2017 | Ryoo | H04B 7/0617 |
| 2017/0374644 | A1* | 12/2017 | Ryu | H04W 76/27 |
| 2018/0270894 | A1 | 9/2018 | Park et al. | |
| 2020/0229133 | A1* | 7/2020 | Yi | H04W 76/28 |
| 2022/0182815 | A1* | 6/2022 | Takeda | H04W 52/0219 |
| 2022/0322283 | A1* | 10/2022 | Ji | H04W 76/14 |

FOREIGN PATENT DOCUMENTS

| | | | | |
|---|---|---|---|---|
| CN | 107431999 | A | 12/2017 | |
| CN | 107852292 | B * | 6/2021 | H04L 5/0048 |
| CN | 109548081 | B | 5/2022 | |
| EP | 2156680 | B1 * | 6/2021 | H04W 68/02 |
| GB | 2568513 | A | 5/2019 | |
| WO | WO-2017034697 | A1 * | 3/2017 | H04W 4/005 |
| WO | 2017076624 | A1 | 5/2017 | |
| WO | 2018203822 | A1 | 11/2018 | |
| WO | 2019030143 | A1 | 2/2019 | |
| WO | 2019063867 | A1 | 4/2019 | |
| WO | WO-2017051502 | A1 * | 5/2019 | |

OTHER PUBLICATIONS

"3GPP TS 38.213 V15.6.0", 3rd Generation Partnership Project; Technical Specification Group Radio Access Network; NR; Physical layer procedures for control (Release 15), Jun. 2019, pp. 1-107.
"Analysis of Service based GWUS", 3GPP TSG-RAN WG2 Meeting #105; R2-1900318; Athens, Greece, Feb. 25-Mar. 2, 2019, pp. 1-5.
"Cross-slot scheduling for UE power saving in paging", 3GPP TSG-RAN WG1 Meeting #97; Tdoc R1-1907328; Reno, USA, May 13-17, 2019, pp. v1-v3.
"NB-IoT—Design of Message Reading Indicator", 3GPP TSG-RAN WG2 #91BIS; R2-154507; Malmo, Sweden, Oct. 5-9, 2015, pp. 1-4.
"On supporting UE group wake up signal", 3GPP TSG-RAN WG2 Meeting #106; R2-1907053; Reno, US, May 13-17, 2019, pp. 1-3.
"UE-group wake-up signal for NB-IoT", 3GPP TSG RAN WG1 Meeting #97; R1-1907192; Reno, USA, May 13-17, 2019, pp. 1-5.
"3GPP TS 38.304 V15.4.0", 3rd Generation Partnership Project; Technical Specification Group Radio Access Network; NR; User Equipment (UE) procedures in Idle mode and RRC Inactive state (Release 15), Jun. 2019, pp. 1-29.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.

* cited by examiner

USER EQUIPMENT (UE) GROUPING CRITERIA AND MECHANISMS FOR FALSE PAGING REDUCTION

TECHNICAL FIELD

The present invention generally relates to wireless communication networks, and particularly relates to improvements in wireless device power consumption while monitoring for paging by a wireless network.

BACKGROUND

Long Term Evolution (LTE) is an umbrella term for so-called fourth generation (4G) radio access technologies developed within the Third-Generation Partnership Project (3GPP) and initially standardized in Releases 8 and 10, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 13 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 120 comprises one or more evolved Node B's (eNB), such as eNBs 125, 130, and 135, and one or more user equipment (UE), such as UE 140. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 120 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 125, 130, and 135. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC, and serves as the local mobility anchor for the data bearers when the UE moves between eNBs, such as eNBs 125, 130, and 135.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (UP) and control plane (CP) protocol functionality. On the Uu interface, the UP carries user information (e.g., data packets) while the CP carries control information between UE and E-UTRAN.

FIG. 2B illustrates a block diagram of an exemplary CP protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the UP and the CP. The PDCP layer provides ciphering/deciphering and integrity protection for both UP and CP, as well as other functions for the UP such as header compression.

In general, the RRC layer (shown in FIG. 2B) controls communications between a UE and an eNB at the radio interface, as well as the mobility of a UE crossing cells. RRC is the highest CP layer in the access stratum (AS) protocol, and also transfers non-access stratum (NAS) messages from above RRC. Such NAS messages are used to control communications between a UE and the EPC.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY interfaces with MAC and RRC layers described above. The MAC provides different logical channels to the RLC layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity, beamforming, and multiple input multiple output (MIMO) antenna processing; and sending radio measurements to higher layers (e.g., RRC).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY DL includes various reference signals, synchronization signals, and discovery signals.

PDSCH is the main physical channel used for unicast DL data transmission, but also for transmission of RAR (random access response), certain system information blocks, and paging information. PBCH carries the basic system information, required by the UE to access the network. PDCCH is used for transmitting DL control information (DCI), mainly scheduling decisions, required for reception of PDSCH, and for UL scheduling grants enabling transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY UL includes various reference signals including demodulation reference signals (DM-RS), which are transmitted to aid the eNB in the reception of an associated PUCCH or PUSCH; and sounding reference signals (SRS), which are not associated with any UL channel. PUSCH is the UL counterpart to the PDSCH. PUCCH is used by UEs to transmit UL control information, including HARQ acknowledgements, channel state information reports, etc. PRACH is used for random access preamble transmission.

The multiple access scheme for the LTE PHY is based on Orthogonal Frequency Division Multiplexing (OFDM) with a cyclic prefix in the DL, and on Single-Carrier Frequency Division Multiple Access (SC-FDMA) with a cyclic prefix in the UL. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure ("type 1") used for LTE FDD DL operation. The DL radio frame has a fixed duration of 12 ms and consists of 20 slots, labeled 0 through 110, each with a fixed duration of 0.5 ms. A 1-ms subframe comprises two consecutive slots where subframe consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 11 (with a normal cyclic prefix) or 6 (with an extended-length cyclic prefix) for subcarrier spacing (SCS) of 15 kHz. The value of $N_{sc}$ is configurable based upon the available channel bandwidth. Since persons of ordinary skill in the art are familiar with the principles of OFDM, further details are omitted in this description. As shown in FIG. 3, a combination of a particular subcarrier in a particular symbol is known as a resource element (RE). Each RE is used to transmit a particular number of bits, depending on the type of modulation and/or bit-mapping constellation used for that RE. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 14 (with a 15-kHz sub-carrier bandwidth) or 24 (11.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb}*N^{RB}_{sc}$ REs. For a normal cyclic prefix and 15-KHz SCS, a PRB pair comprises 168 REs.

An exemplary LTE FDD UL radio frame configured in a similar manner as the exemplary FDD DL radio frame shown in FIG. 3. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources (such as the DL resource grid shown in FIG. 3). For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries UL control information such as scheduling requests, CSI for the DL channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (10) REGs, each of which can comprise four (4) REs.

As briefly mentioned above, the LTE RRC layer (shown in FIGS. 2B-C) controls communications between a UE and an eNB at the radio interface, as well as the mobility of a UE between cells in the E-UTRAN. Prior to 3GPP Release (Rel-)13, there were two (2) RRC states defined for a UE. More specifically, after the UE is powered ON it will be in the RRC_IDLE state until the RRC connection is established, at which time it will transition to RRC_CONNECTED state (where data transfer can occur). After a connection is released, the UE returns to RRC_IDLE. In RRC_IDLE state, the UE's radio is active on a discontinuous reception (DRX) schedule configured by upper layers. During DRX active periods, an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the evolved packet core (EPC) and has an assigned IP address, but is not known to the serving eNB (e.g., there is no stored context).

As such, the eNB is unaware, in advance, whether a particular UE is in the eNB's cell where it is being paged. Typically, several UEs are assigned to the same paging occasion (PO) on the PDCCH. As a result, if is a paging message for any of the UEs listening to the same PO, all of those UEs will have to decode the contents of the PDSCH to see whether the paging message was intended for them.

In LTE 3GPP Rel-13 a mechanism was introduced for the UE to be suspended by the network in a suspended state similar to RRC_IDLE but with some important differences. First, the suspended state is not a third RRC "state" alongside RRC_IDLE and RRC_CONNECTED; rather it can be viewed as a "substate" of RRC_IDLE. Second, both the UE and the serving eNB store the UE's AS (e.g., S1-AP) context and RRC context after suspension. Later when the suspended UE needs to resume a connection (e.g., to send UL data), instead of going through the conventional service request procedure, the suspended UE merely sends an RRC- ConnectionResume-Request message to the eNB. The eNB resumes the S1AP context and responds with a RRCConnectionResume message. There is no elaborate exchange of security context between MME and eNB and no setup of AS security context. The preserved AS and RRC contexts are merely resumed from where they were suspended earlier. Reducing the signaling can provide reduced UE latency (e.g. for smart phones accessing Internet) and reduced UE signaling, which can lead to reduced UE energy consumption, particularly for machine type communication (MTC) devices that send very little data (i.e., signaling being a primary consumer of energy).

In 3GPP, a study item on a new radio interface for 5G has been completed and 3GPP has now continued to standardize this new radio interface, abbreviated by NR (New Radio). While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

As part of the 3GPP standardized work on 5G, it has been decided that NR should support an RRC_INACTIVE state with similar properties as the suspended state in LTE 3GPP Rel-13. The RRC_INACTIVE state has slightly different properties in that it is a separate RRC state and not part of RRC_IDLE as in LTE. Additionally, the core network-radio access network (CN/RAN) connection (NG or N2 interface) is kept alive (were the interfaces from CN to the RAN related to a particular UE are maintained) during RRC_INACTIVE while it was suspended in LTE.

Similar to LTE UEs in RRC_IDLE, NR UEs in both RRC_IDLE and RRC_INACTIVE monitor a paging channel on PDCCH. Also similar to LTE, several NR UEs are assigned to the same paging occasion (PO) on PDCCH such that a paging message intended for any of those UEs will cause all of those UEs to decode the contents of the PDSCH to see whether the paging message was intended for them. The scenario where a UE, after detecting a paging message on PDCCH, decodes the PDSCH but does not find its identity is called "false paging." These operations during false paging can consume considerable amounts of the UE's stored energy.

In general, the more UEs present in a cell and assigned to the same PO, the more energy is wasted by UEs decoding PDSCH a result of false paging.

SUMMARY

Embodiments of the present disclosure provide specific improvements to communication between user equipment (UE) and network nodes in a wireless communication network, such as by facilitating solutions to overcome the exemplary problems described above. A The embodiments disclose techniques that advantageously can reduce false paging and unnecessary UE power consumption, while facilitating UEs to receive pages intended for them in a timely manner.

Some exemplary embodiments of the present disclosure include methods and/or procedures for selective paging of a plurality of user equipment (UEs) operating in a cell served by a network node in a radio access network (RAN). The exemplary method and/or procedure can be performed by a network node (e.g., base station, eNB, gNB, etc., or component thereof) of the RAN (e.g., NG-RAN, E-UTRAN, etc.).

The exemplary method and/or procedure can include assigning the plurality of UEs to a plurality of paging subgroups based on one or more operating parameters of the respective UEs. The paging subgroups can be associated with a first sequence of paging occasions (POs) to which all of the UEs are assigned.

The exemplary method and/or procedure can also include transmitting a paging indicator during a particular PO of the first sequence. The paging indicator can indicate which of the paging subgroups associated with the particular PO should receive a paging message from the network node. The exemplary method and/or procedure can also include transmitting the paging message within the cell.

The paging message can be directed to UEs within the subgroups indicated by the paging indicator.

In various embodiments, the one or more operating parameters can include any of the following: radio resource control (RRC) states of the respective UEs; frequency of paging the respective UEs; areas in which the respective UEs are paged; elapsed time since a most recent communication event between the respective UEs and the network node; number of communication events between the respective UEs and the network node during a recent time interval; and respective UE discontinuous reception (DRX) cycle times.

In some embodiments, the paging indicator can be transmitted in (e.g. in the contents of) a paging downlink control information (DCI) on a physical downlink control channel (PDCCH), and the paging message can be transmitted on a physical downlink shared channel (PDSCH).

In some embodiments, the plurality of subgroups can include a first subgroup corresponding to UEs in RRC_INACTIVE state, and a second subgroup corresponding to UEs in RRC_IDLE state.

In some embodiments, the plurality of subgroups can include a first subgroup corresponding to UEs that are paged at least as frequently as a predetermined threshold, and a second subgroup corresponding to UEs that are paged less frequently than the predetermined threshold. In such embodiments, the exemplary method and/or procedure can include configuring the UEs of the second subgroup for cross-slot scheduling between all paging indicators that indicate the second subgroup and the corresponding paging messages.

Other exemplary embodiments of the present disclosure include methods and/or procedures for receiving paging messages from a network node serving a cell in a RAN. These exemplary methods and/or procedures can be performed by a user equipment (e.g., UE, wireless device, IoT device, modem, etc. or component thereof) in communication with a network node (e.g., base stations, eNBs, gNBs, etc., or components thereof) in the RAN.

The exemplary method and/or procedure can also include receiving, from the network node during a particular PO, a paging indicator that indicates which of the paging subgroups associated with the particular PO should receive a paging message from the network node. The exemplary method and/or procedure can also include determining whether the UE is assigned to any of the paging subgroups indicated by the paging indicator. The exemplary method and/or procedure can also include, based on determining that the UE is assigned to at least one of the paging subgroups indicated by the paging indicator, receiving the paging message from the network node. Alternately, based on determining that the UE is not assigned to any of the paging subgroups indicated by the paging indicator, the UE can refrain from receiving the paging message. In such case, the UE can go to sleep after reading the paging indicator.

In some embodiments, these exemplary methods and/or procedures can include determining a paging subgroup assigned to the UE based on one or more UE operating parameters. The paging subgroups can be associated with a first sequence of paging occasions (POs) to which the UE is assigned. In various embodiments, the one or more operating parameters can include any of the following: RRC states of the respective UEs; frequency of paging the respective UEs; areas in which the respective UEs are paged; elapsed time since a most recent communication event between the respective UEs and the network node; number of communication events between the respective UEs and the network node during a recent time interval; and respective UE DRX cycle times. Alternately, the UE can receive a configuration message indicating the subgroup assignment.

In some embodiments, the paging indicator can be received in (e.g., in the contents of) a paging DCI on a PDCCH, and the paging message can be transmitted on a PDSCH.

In some embodiments, the plurality of subgroups can include a first subgroup corresponding to UEs in RRC_INACTIVE state, and a second subgroup corresponding to UEs in RRC_IDLE state.

In some embodiments, the plurality of subgroups can include a first subgroup corresponding to UEs that are paged at least as frequently as a predetermined threshold, and a second subgroup corresponding to UEs that are paged less frequently than the predetermined threshold. In such embodiments, the exemplary method and/or procedure can include configuring the UEs of the second subgroup for cross-slot scheduling between all paging indicators that indicate the second subgroup and the corresponding paging messages.

Other exemplary embodiments include network nodes (e.g., base stations, eNBs, gNBs, CUs, DUs, controllers, etc.) or user equipment (UEs, e.g., wireless devices, IoT devices, or components thereof) configured to perform operations corresponding to any of the exemplary methods and/or procedures described herein. Other exemplary embodiments include non-transitory, computer-readable media storing program instructions that, when executed by processing circuitry, configure such network nodes or such UEs to perform operations corresponding to any of the exemplary methods and/or procedures described herein.

These and other objects, features and advantages of the exemplary embodiments of the present disclosure will become apparent upon reading the following Detailed Description in view of the Drawings briefly described below.

DETAILED DESCRIPTION

Figure 1:
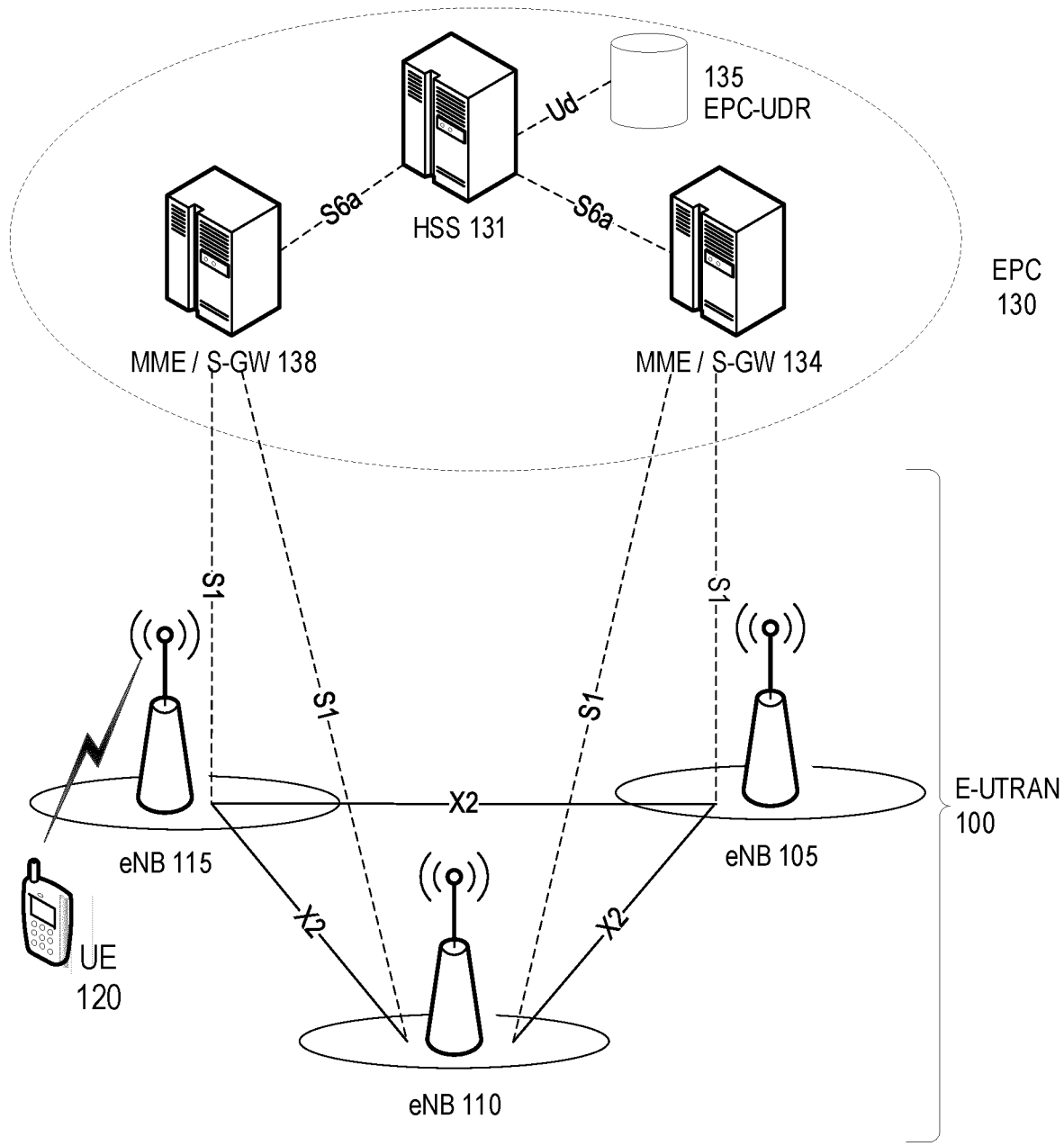
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
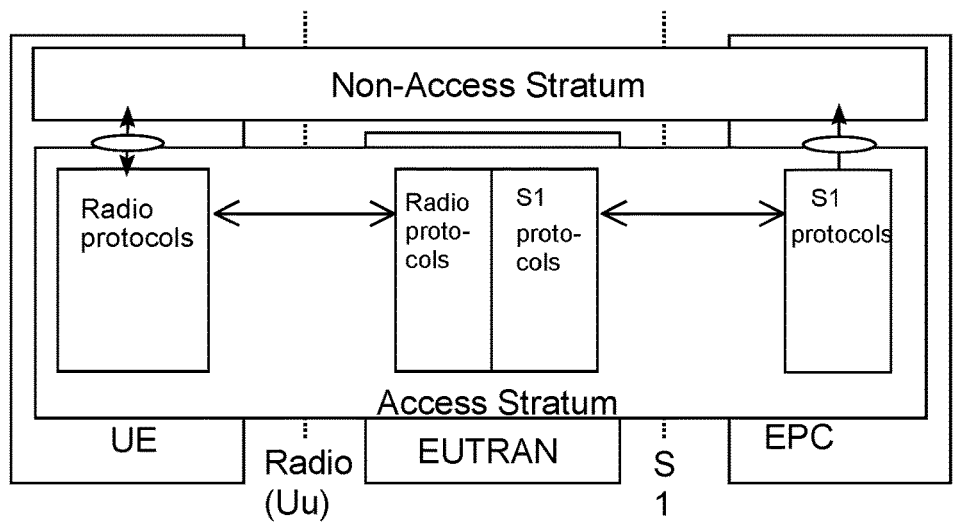
FIG. 2A is a high-level block diagram of an exemplary E-UTRAN architecture in terms of its constituent components, protocols, and interfaces.
Figure 2B:
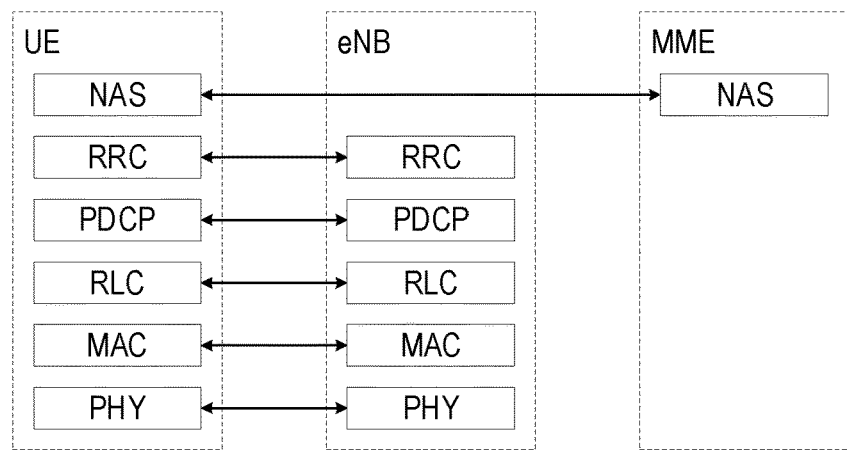
FIG. 2B is a block diagram of exemplary protocol layers of the control-plane portion of the radio (Uu) interface between a user equipment (UE) and the E-UTRAN.
Figure 2C:
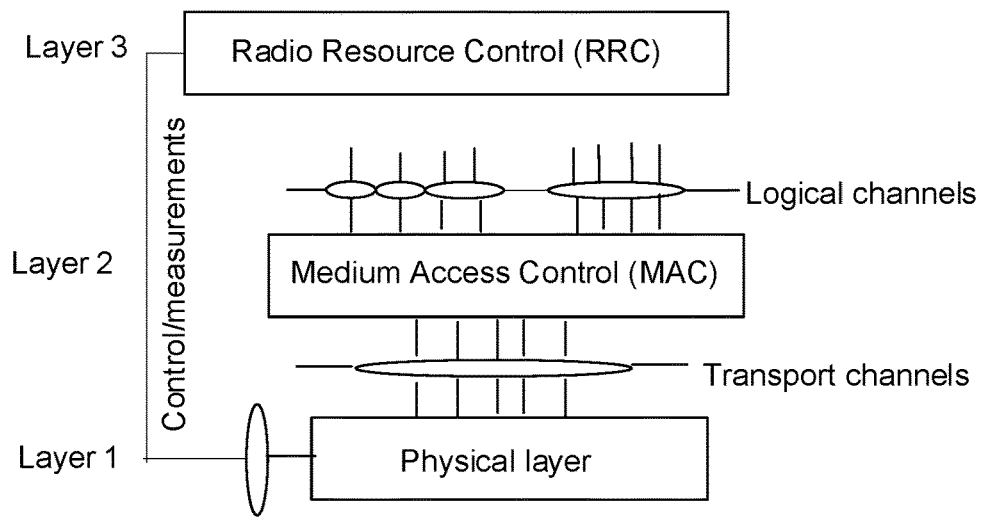
FIG. 2C is a block diagram of an exemplary LTE radio interface protocol architecture from the perspective of the PHY layer.
Figure 3:
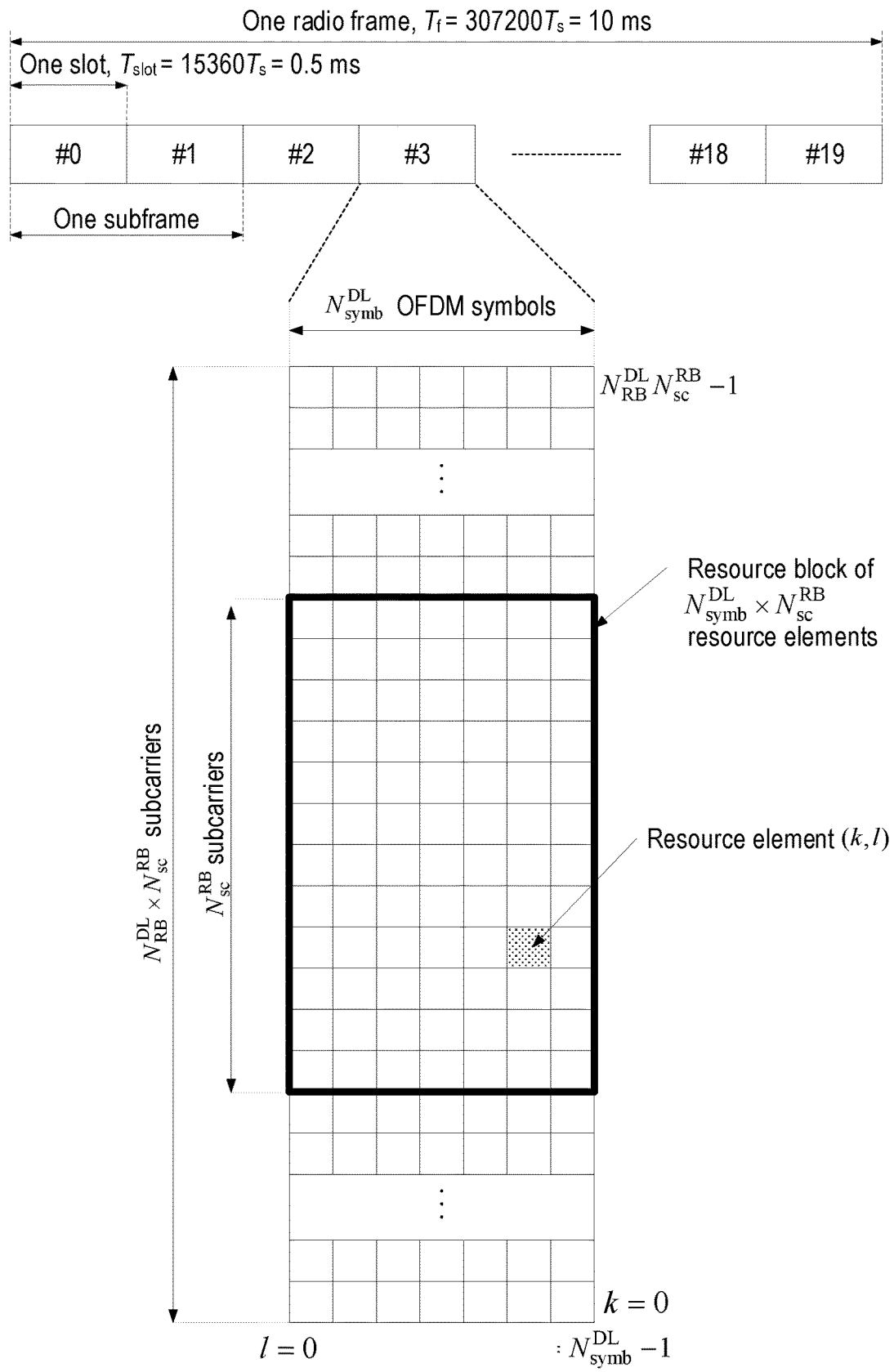
FIG. 3 is a block diagram of an exemplary downlink (DL) LTE radio frame structures used for frequency division duplexing (FDD) operation.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, the more UEs present in a cell and assigned to the same paging occasion (PO), the more energy is wasted by UEs decoding PDSCH a result of false paging. Accordingly, there is a need for techniques that can reduce false paging and unnecessary UE power consumption, while facilitating UEs to receive pages intended for them in a timely manner. These issues are discussed in more detail below.

Figure 4:
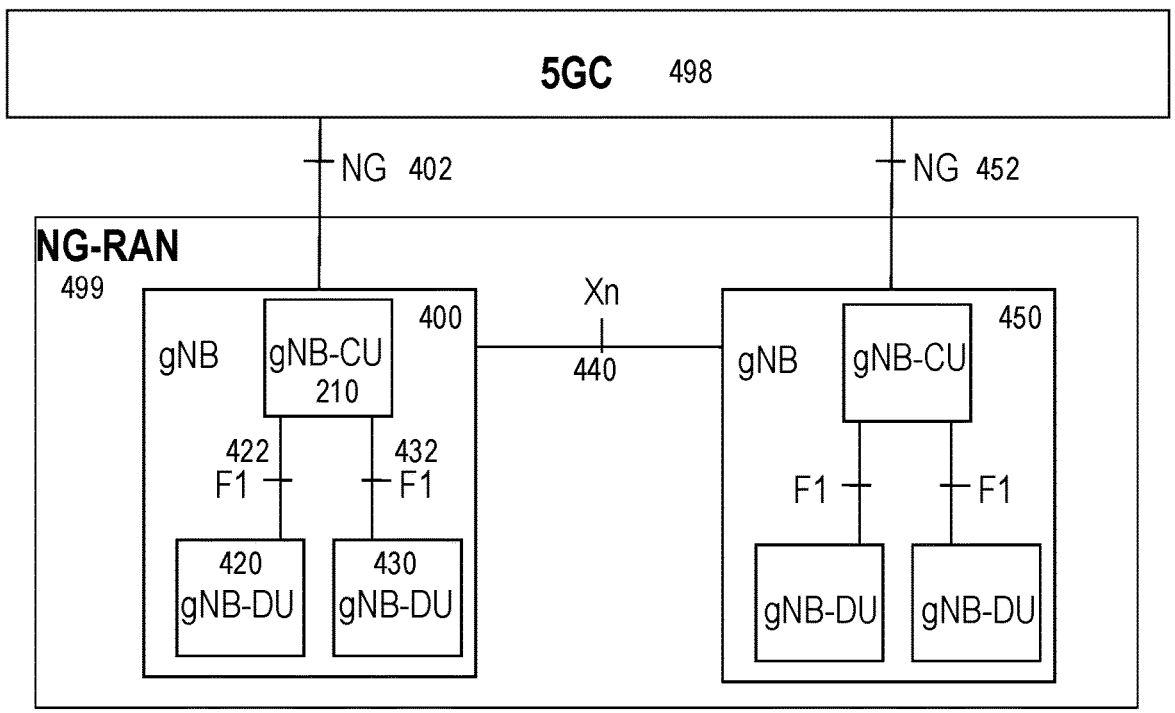
FIG. 4 shows an exemplary 5G network architecture.

FIG. 4 illustrates a high-level view of an exemplary 5G network architecture, including a Next Generation RAN (NG-RAN) 499 and a 5G Core (5GC) 498. NG-RAN 499 can include one or more gNodeB's (gNBs) connected to the 5GC via one or more NG interfaces, such as gNBs 400, 450 connected via interfaces 402, 452, respectively. More specifically, gNBs 400, 450 can be connected to one or more Access and Mobility Management Functions (AMF) in the 5GC 498 via respective NG-C interfaces. Similarly, gNBs 400, 450 can be connected to one or more User Plane Functions (UPFs) in 5GC 498 via respective NG-U interfaces.

Although not shown, in some deployments 5GC 498 can be replaced by an Evolved Packet Core (EPC), which conventionally has been used together with LTE E-UTRAN. In such deployments, gNBs 400, 450 can connect to one or more Mobility Management Entities (MMEs) in EPC 498 via respective S1-C interfaces. Similarly, gNBs 400, 450 can connect to one or more Serving Gateways (SGWs) in EPC via respective NG-U interfaces.

In addition, the gNBs can be connected to each other via one or more Xn interfaces, such as Xn interface 440 between gNBs 400 and 450. The radio technology for the NG-RAN is often referred to as "New Radio" (NR). With respect to the NR interface to UEs, each of the gNBs can support frequency division duplexing (FDD), time division duplexing (TDD), or a combination thereof.

NG-RAN 499 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. If security protection for control plane (CP) and user plane (UP) data on Transport Network Layer (TNL) of NG-RAN interfaces is supported, Network domain security/Internet Protocol (NDS/IP) is applied.

The NG RAN logical nodes shown in FIG. 4 (and described in 3GPP Technical Specification (TS) 38.401 Rel. 15 and 3GPP TR 38.801 Rel. 14) include a Central Unit (CU or gNB-CU) and one or more Distributed Units (DU or gNB-DU). For example, gNB 400 includes gNB-CU 410 and gNB-DUs 420 and 430. CUs (e.g., gNB-CU 410) are logical nodes that host higher-layer protocols and perform various gNB functions such controlling the operation of DUs. A DU (e.g., gNB-DUs 420, 430) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 422 and 432 shown in FIG. 4. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. The CU can host RRC and PDCP, where PDCP is assumed to handle both UP traffic and CP traffic. Nevertheless, other situations may utilize other protocol splits that by hosting certain protocols in the CU and certain others in the DU. Also, centralized control plane protocols (e.g., PDCP-C and RRC) can locate in a different CU with respect to the centralized user plane protocols (e.g., PDCP-U).

Figure 5:
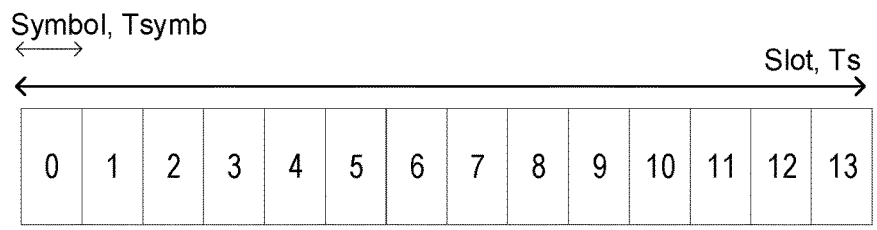
FIGS. 5-6 show various exemplary NR timeslot configurations.

Similar to LTE, the NR PHY uses CP-OFDM (Cyclic Prefix Orthogonal Frequency Division Multiplexing) in the DL and both CP-OFDM and Discrete Fourier Transform (DFT)-spread OFDM (DFT-S-OFDM) in the UL. In the time domain, NR DL and UL physical resources are organized into equally-sized subframes of 1 ms each. A subframe is further divided into multiple slots of equal duration, with each slot including multiple OFDM-based symbols. An NR slot can include 14 OFDM symbols with normal cyclic prefix, or 12 OFDM symbols with extended cyclic prefix. FIG. 5 shows an exemplary NR slot configuration comprising 14 symbols, where the slot and symbols durations are denoted $T_s$ and $T_{symb}$, respectively.

In addition, NR includes a Type-B scheduling, also known as "mini-slots." These are shorter than slots, typically ranging from one symbol up to one less than the number of symbols in a slot (e.g., 6 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., ultra-reliable low-latency communication (URLLC)). However, mini-slots are not service-specific and can also be used for enhanced mobile broadband (eMBB) or other services.

Similar to LTE, NR data scheduling is done on a per-slot basis. In each slot, the base station (e.g., gNB) transmits DL control information (DCI) over PDCCH that indicates which UE is scheduled to receive data in that slot, which resource blocks (RBs) will carry that data. A UE first detects and decodes DCI and, if successful, then decodes the corresponding PDSCH based on the decoded DCI. Likewise, DCI can include UL grants that indicate which UE is scheduled to transmit data in that slot, which RBs will carry that data. a UE first detects and decodes an UL grant from PDCCH and, if successful, then transmits the corresponding PUSCH on the resources indicated by the grant. DCI formats 0_0 and 0_1 are used to convey UL grants for PUSCH, while DCI formats 1_0 and 1_1 are used to convey PDSCH scheduling. Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple terminals or user equipments, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

The payload together with the identifier-scrambled CRC is encoded and transmitted on the PDCCH. Each UE tries to detect a PDCCH with multiple hypothesis with respect to payload size and location in the time-frequency grid based on its configured search spaces. Once a UE decodes a DCI it de-scrambles the CRC with RNTI(s) that is(are) assigned to it and/or associated with the particular PDCCH search space. In case of a match, the UE considers the detected DCI addressed to itself and follows the instructions (e.g., scheduling information) contained in the DCI.

Within an NR slot, the PDCCH channels are confined to a particular number of symbols and a particular number of subcarriers, where this region is referred to as the control resource set (CORESET). A CORESET is made up of multiple RBs (i.e., multiples of 14 resource elements (REs)) in the frequency domain and either one, two, or three OFDM symbols in the time domain, as further defined in 3GPP TS 38.213 V15.6.0, section 11.3.2.2. A CORESET is functionally similar to the control region in an LTE subframe. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

Figure 6:
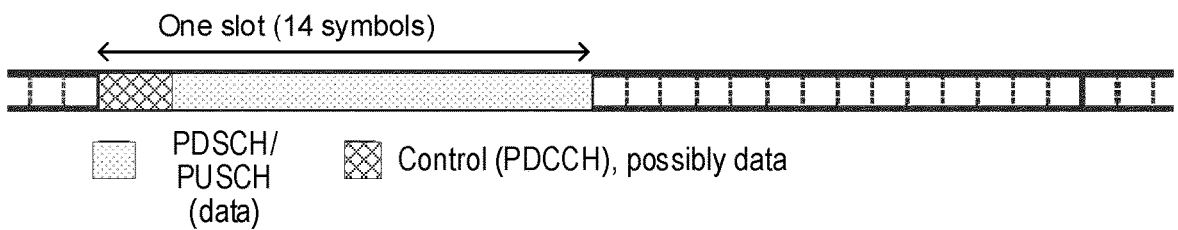

FIG. 6 shows an exemplary NR slot structure with 15-kHz subcarrier spacing. In this exemplary structure, the first two symbols contain PDCCH and each of the remaining 12 symbols contains a physical data channel (PDxCH), i.e., either a PDSCH or PUSCH. Depending on the CORESET configuration, however, the first two slots can also carry PDSCH or other information, as required.

A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

The smallest unit used for defining a CORESET is a Resource Element Group (REG), which spans one PRB in frequency and one OFDM symbol in time. Each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET can be indicated to the UE. The UE can assume that any precoder used for the transmission of the PDCCH is the same for all the REGs in the REG bundle. A REG bundle may consist of 2, 3, or 6 REGs.

A control channel element (CCE) consists of six (6) REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

A hashing function can be used to determine the CCEs corresponding to PDCCH candidates that a UE must monitor within a search space set. The hashing is done differently for different UEs so that the CCEs used by the UEs are randomized and the probability of collisions between multiple UEs for which PDCCH messages are included in a CORESET is reduced.

A PDCCH candidate may span 1, 2, 4, 8, or 16 CCEs. If more than one CCE is used, the information in the first CCE is repeated in the other CCEs. Therefore, the number of aggregated CCEs used is referred to as the aggregation level (AL) for the PDCCH candidate. By varying the AL, PDCCH can be made more or less robust for a certain payload size. In other words, PDCCH link adaptation can be performed by adjusting the aggregation level.

Figure 7:
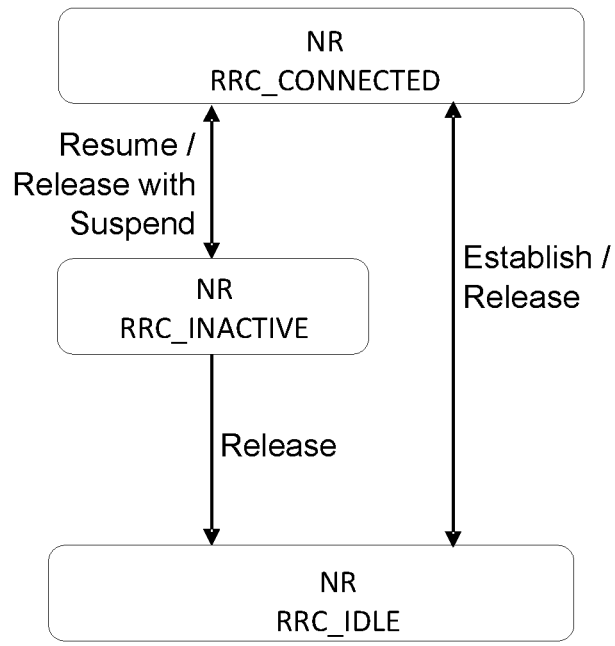
FIG. 7 shows an exemplary state transition diagram between radio resource control (RRC) states in NR.

As briefly mentioned above, at any time an operational NR UE can operate in RRC_CONNECTED, RRC_IDLE, or RRC_INACTIVE state. FIG. 7 is an exemplary state transition diagram showing possible transitions between these RRC states in NR. More specifically, a UE transitions between RRC_IDLE and RRC_CONNECTED based on connection establishment and release procedures. A UE also moves from RRC_INACTIVE to RRC_IDLE based on a connection release procedure. Finally, a UE moves from RRC_CONNECTED to RRC_INACTIVE based on a connection release with suspend procedure, while moving back to RRC_CONNECTED based on a connection resume procedure.

When a UE is in RRC_IDLE or RRC_INACTIVE states, it monitors PDCCH periodically (at configured paging occasions) to check for scheduling of paging requests to be subsequently transmitted on PDSCH. In RRC_CONNECTED mode, a UE monitors PDCCH for UL/DL data scheduling on PDSCH/PUSCH as well as for other purposes. In between these monitoring occasions, the UE goes to sleep to reduce energy consumption. This sleep-wake cycle is known as "discontinuous reception" or DRX. The amount of UE power savings is related to wake period ("DRX ON") duration as a fraction of the entire DRX duty cycle.

In case the network wants to reach the UE (e.g., for incoming traffic), it pages the UE during these configured paging occasions (POs). The network initially tries to page the UE in its last known location (i.e., cell), but in case the UE does not respond to this initial paging, the network typically repeats the paging message in an expanded paging area (e.g., covering more cells). The paging message from the network can be initiated by the 5GC or the NG-RAN. More specifically, the 5GC-Initiated paging is used to reach the UEs in RRC_IDLE state, whereas RAN-Initiated paging (e.g., by serving gNB) is used to reach UEs in RRC_INACTIVE state.

Within a particular cell, the network may configure a certain number of POs per DRX cycle (e.g., during a cycle of 1.28 seconds). This information is broadcast in system information. When a UE registers with the 5GC, it is assigned a UE temporary mobile subscriber identity called 5G-S-TMSI. This identity is used by the UE and network in a predetermined formula to derive during which of the configured POs the UE will listen for paging messages.

As mentioned above, several UEs can be listening for a paging message during the same PO. Each of the UEs that detects a paging DCI (e.g., DCI 1_0 with paging radio network temporary identifier (P-RNTI)-scrambled cyclic redundancy check (CRC)), receive the PDSCH and decode its payload to determine whether their UE identity is present, which indicates that the paging message was intended for them. In general, the PDSCH payload can carry up to 32 identities, such that up to 32 UEs can be paged during the same PO.

Figure 8:
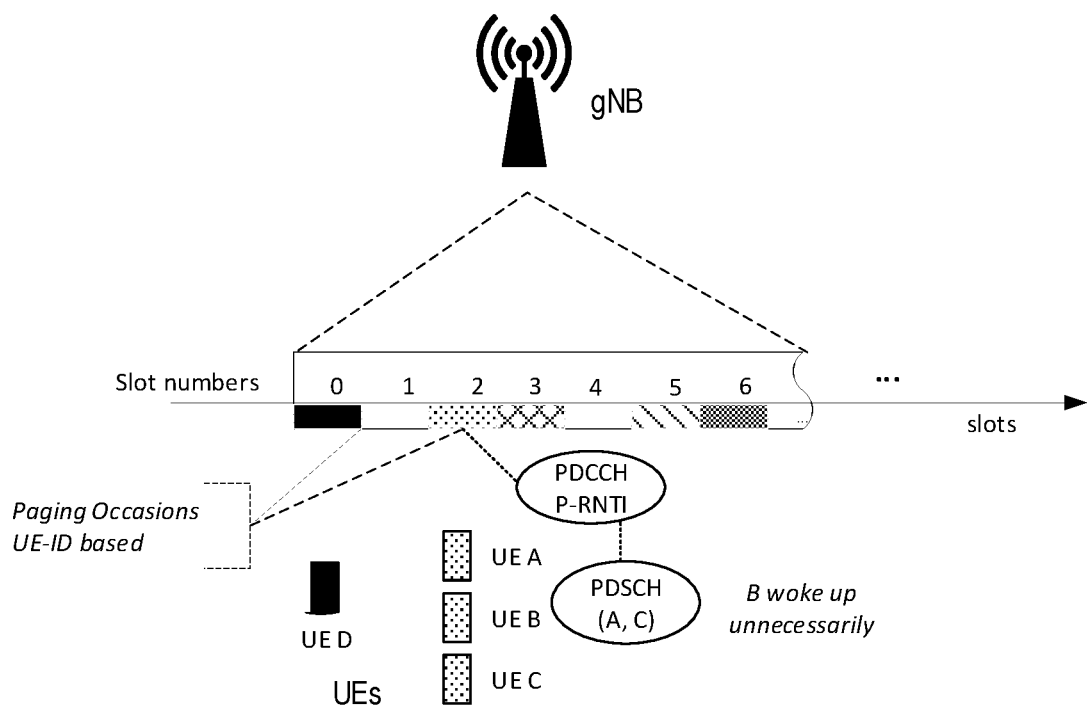
FIG. 8 shows an exemplary paging arrangement in which four UEs are assigned to two different paging occasions (POs).

FIG. 8 illustrates an exemplary arrangement in which four UEs are assigned to two different POs. More specifically, in this example, UE D is assigned to the PO that occurs in slot 0, while UEs A, B, and C are assigned to the PO that occurs in slot 2 based on the assigned 5G-S-TMSI. If a P-RNTI associated with UEs A-C is included in the paging DCI sent in slot 2, all of UEs A-C will receive it and will decode the associated PDSCH. In this case, however, only UEs A and C are actually paged, such that UE B unnecessarily decodes the PDSCH message that does not include its identity (i.e., UE B is falsely paged).

Even though a UE's 5G-S-TMSI is used to derive the applicable POs, the UE may look for a different identity in the PDSCH message. For example, UEs in RRC_IDLE look for 5G-S-TMSI, since that identity is known to 5GC that is paging these UEs. In contrast, UEs in RRC_INACTIVE must look both for 5G-S-TMSI and an I-RNTI identity assigned by the NG-RAN. This is because a UE in RRC_INACTIVE can be paged by the 5GC or by the NG-RAN.

As the number of UEs in RRC_IDLE or RRC_INACTIVE state in a cell increases, more UEs will be assigned to each PO. The more UEs present in a cell and assigned to the same PO, the more energy is wasted by UEs decoding PDSCH during false paging. One possible solution is to assign fewer UEs to each PO. However, this can result in one or more problems. If the total number of POs per time unit is kept fixed in the cell, then the time between successive POs for each individual UE will increase, resulting in longer paging delays for each UE. On the other hand, increasing the total number of POs per time unit (such that the time between successive POs for a UE is fixed) will increase the required PDCCH paging resources for the cell. This reduces the resources available for PDSCH and/or PUSCH, which can affect latency and/or throughput for data services.

Accordingly, there is a need for techniques that reduce UE power consumption due to false paging, while maintaining UE paging latency without increasing the amount of PDCCH paging resources required. Exemplary embodiments of the present disclosure address these and other problems, issues, and/or drawbacks by providing novel UE grouping criteria and mechanisms that minimize unnecessary decoding of PDSCH related to paging, thereby improving UE power consumption while maintaining other aspects of UE and/or network performance at acceptable levels.

Some embodiments include grouping criteria that can be used by a network to form UE paging subgroups that improve, reduce, and/or optimize UE energy consumption or other relevant metric(s). For example, grouping criteria can be used to separate RRC_INACTIVE UEs from RRC_IDLE UEs for paging purposes. Other exemplary grouping criteria can include paging area (e.g., last known cell vs. expanded area), UE paging history, cross-slot vs. same-slot PDSCH scheduling, and desired distribution among available groups.

Other embodiments include grouping indications that can be used a UE, upon paging network temporary identifier (P-RNTI) PDCCH detection, to determine whether it belongs to a relevant subgroup being paged. For example, explicit grouping indicators can be included in paging DCI on PDCCH, or implicit grouping indicators can be based on specific POs associated with specific groups in a manner understood by both network and UE.

At a high level, disclosed embodiments address problems related to false paging by providing additional indications whether the detection of an associated P-RNTI in a paging DCI on PDCCH during a PO should be interpreted by a UE as signal to subsequently receive and decode PDCCH for a paging message. Various group indicators can be included in the paging DCI, as explained further below. If the UE determines that it does not belong to a group (or subgroup) indicated in the paging DCI, it can switch off rather than receiving the PDSCH. In this manner, these techniques can reduce a UE's reaction to false pages and associated wasted energy consumption.

In a first group of embodiments, indicator bits can be used to indicate which subgroup(s) are targeted with a paging DCI. 3GPP specifications define UE-identity (e.g., 5G-S-TMSI) based formulas that divide UEs into groups that receive PDCCH in different POs, as configured by the network. From the network's perspective, reducing the number of POs is beneficial as each PO consumes PDCCH resources. As such, it is beneficial for the network to group as many UEs as possible (e.g., up to 32 allowed by 3GPP specifications) in the same PO and indicate in the paging DCI on PDCCH that a paging message associated with the group will be subsequently transmitted in the associated PDSCH.

In these embodiments, the UEs belonging to the same PO can be further grouped into X subgroups and addressed via a subgroup indicator in the paging DCI. For example, X=4 code points can be taken from existing unused set of bits within the paging DCI (i.e., DCI format 1_0 defined by 3GPP specifications) to divide the UEs belonging to a particular PO into four subgroups. For example, each of the four bits can be associated with a particular subgroup. Additional reserved or repurposed DCI bits can be used to increase the number of subgroups, which further reduces the number of UEs per subgroup.

When UEs are arranged into subgroups in this manner, the network can indicate in a paging DCI (e.g., via a subgroup indicator) which of the subgroups assigned to that PO should decode the subsequent PDSCH for a paging message. for example, in the case of X=4 subgroups, a four-bit indicator value "1000" could mean that only UEs belonging to subgroup 1 (associated with the "1" bit) need to decode PDSCH, while a value "1010" could mean that only UEs belonging to subgroups 1 and 3 (associated with the two "1" bits) need to decode PDSCH. One or more of the bit combinations can be given a special meaning. For example, a value "0000" could indicate that UEs that have been awake within the last Z seconds should decode PDSCH, where Z can be RRC-configured and/or UE-specific. Alternatively, a value "0000" could indicate that all the UEs assigned to the PO—including those not assigned to a subgroup—should read the paging message(s) in PDSCH.

UEs can be assigned to subgroups in various ways, provided that both the network and the UEs have a common understanding of the assignment mechanism used. For example, subgroup assignment can be based on subgroup identifiers (SubGroupId) determined according to:

SubGroupId=UE_ID modulo $X$, where X is the number of subgroups (e.g., X=4 as in the above example) and UE identity (UE_ID) can be, or be derived from, an existing UE identifier such as 5G-S-TMSI. As another example, subgroup identifiers can be determined according to:

SubGroupId=(UE_ID/$Y$)modulo $X$, where Y is a value used to distribute UEs among subgroups in some desired manner (e.g., uniformly and/or evenly). Y can be a predetermined constant or can be configured by the network, such as by RRC signaling. If 5G-S-TMSI values are allocated randomly and the number of UEs in the system is high, the subgroup sizes should be approximately equal. In some embodiments, however, the network can assign 5G-S-TMSI values so that resulting subgroups sizes are approximately equal, thereby reducing false paging.

In other embodiments, the division of UEs into subgroups can also be done by assigning them to specific POs, such that the time-domain PO operates as the subgroup indicator. In some cases, such grouping may be possible using the 3GPP Rel-15 mapping of 5G-S-TMSI to PO. In other cases, additional UE identifier mapping rules or additional grouping indication signaling can be introduced.

In a second group of embodiments, the network can assign UEs to specific subgroups via dedicated configuration, such as upon registration or connection establishment. In these embodiments, various criteria can be used for subgroup assignment, as described in more detail below.

In some of these embodiments, the network can divide UEs assigned to a PO into subgroups based on network knowledge about paging frequency of these UEs. As an example, UEs that have been (and/or will be) paged frequently are grouped together while other UEs that have been (and/or will be) paged infrequently can be grouped together in a different subgroup. In other embodiments, the network can group UEs according to elapsed time since some previous communication event with the network, such as most recent paging, most recent data transmission/reception, most recent connection release, etc. In other embodiments, the network can group UEs according to the number of communication events (e.g., POs or connections) during a recent time interval, e.g., the past one hour. In any of these embodiments, one or more thresholds and/or metrics can be used to assign UEs into subgroups, with such thresholds and/or metrics being predetermined (e.g., specified in 3GPP standards) or configured via RRC signaling.

Based on these groupings, the network can then send a subgroup indicator in the paging DCI to indicate which group(s) should decode the subsequent PDSCH for a paging message. In some embodiments, UEs being paged more frequently (or being above/below a metric or threshold) can also respond to paging DCIs directed to UEs paged less frequently (or being below/above the metric or threshold), but not vice versa.

In other embodiments of the second group, the network can divide UEs assigned to a PO into subgroups based on the configured DRX periods for the respective UEs. For example, the network can assign UEs with configured DRX cycles of length 640, 1280, 2560, 5120, and 10240 ms into five corresponding groups. Subsequently, the network can send a five-bit subgroup indicator in the paging DCI, with each bit indicating (via "1" or "0" value) whether or not a corresponding subgroup should decode the subsequent PDSCH for a paging message.

In other embodiments of the second group, the network can divide UEs assigned to a PO into subgroups based on RRC state. As described above, both UEs in RRC_IDLE and RRC_INACTIVE state might be listening to the same PO. Therefore, an indicator can be introduced (e.g., called InactivePaging) to the paging DCI informing UEs assigned to the PO whether a paging message is intended for UEs in RRC_INACTIVE state. In this manner, UEs in RRC_IDLE that receive the paging DCI will not bother decoding PDSCH if the InactivePaging bit is set. Note that the InactivePaging indicator can be combined with other subgrouping techniques, such as assignment based on 5G-S-TMSI, DRX cycle, etc.

In other embodiments of the second group, the network can divide UEs assigned to a PO into subgroups based on paging expansion. As briefly mentioned above, the network will attempt to page a UE in the last cell where it was connected to the network. If a UE has moved to another cell since its last connection to the network, the network will be unable to page the UE in the last-known cell. As a result, the network expand and/or escalate the UE paging to a larger area involving multiple cells, which can result in false paging in those other cells. To address this issue, an indicator can be added to paging DCIs informing the UEs whether the upcoming paging message is the result of paging expansion/ escalation. If this indicator is set, only UEs that have moved to a cell different from their last serving cell will decode the subsequent PDSCH for a paging message. UEs that have remained in the same cell since their last connection to the network will refrain from decoding the subsequent PDSCH. Note that the paging expansion indicator can be combined with other subgrouping techniques, such as assignment based on 5G-S-TMSI, DRX cycle, etc.

For a UE, it is beneficial to have prior knowledge about whether the paging DCI on PDCCH might point to a paging message on a PDSCH within the same timeslot as the PDCCH (referred to as "same-slot") or within a subsequent timeslot (referred to as "cross-slot"). If a UE knows that cross-slot scheduling is guaranteed, it can open up its receiver just enough to capture PDCCH (typically one symbol duration) and then put the receiver in micro-sleep while processing the PDCCH. If the paging DCI indicates that PDSCH decoding is needed, the UE can wake up its receiver again in the subsequent slot.

On the other hand, if PDSCH decoding is not needed, then the UE can turn off its receiver immediately after PDCCH reception rather than waiting until the PDCCH decoding process is finished. However, cross-slot scheduling is only energy efficient for the UE if most received PDCCHs result in no PDSCH decoding. If PDCCH processing often leads to PDSCH decoding, then the prolonged time is actually an energy penalty for the UE.

Accordingly, in other embodiments of the second group, the network can configure the UEs of different subgroups with prior knowledge about whether or not they will be cross-slot scheduled. For example, if the network has divided the UEs based on paging frequency such that UEs that are paged infrequently belong to same subgroup, then the network can also configure the UEs belonging to that subgroup for PDCCH-PDSCH cross-slot scheduling. In this manner, when a paging DCI includes a subgroup indicator directed to the UEs in that infrequently paged subgroup, those UEs will know (based on the network configuration) that the subsequent paging message will be carried by a PDSCH in a subsequent slot.

Various other embodiments can be used independently or in combination with embodiments of the two groups described above. For example, the network can have the capability to change a UE's subgroup assignment after initial assignment. As a more specific example, if the UEs are divided into frequently and infrequently paged subgroups, a UE may be initially assigned to the infrequently paged subgroup but subsequently it may be needed to be paged more often (e.g., due to a change in the UE's operational conditions). In such case, the network can reassign the UE to the frequently paged subgroup through the RRC release procedure. As another specific example, the network may want to change the scheduling of some or all members of a subgroup from cross-slot to same-slot, or vice versa. In such case, the network can reconfigure the 3GPP K0 values that determine PDCCH-PDSCH scheduling delay through the RRC release procedure toward some or all of the UEs of the affected subgroup.

In other embodiments, to support configuration/reconfiguration of UEs into subgroups, the network can maintain a UE paging list containing UE IDs, assigned PO, Group_ID, Subgroup_ID, paging frequency, and/or other parameters related to subgroup configuration.

In other embodiments, if a UE in a subgroup is falsely paged more than a predetermined number of times during a predetermined duration (e.g., minutes, hours, etc.), the UE can send a UE assistant message to the network that recommends the network to allocate it into a different subgroup to reduce the its false paging rate. The network's change in subgroup assignment can be responsive to this message from the UE.

In the 3GPP Rel-15 paging DCI (i.e., format 1_0), there are six (6) reserved bits that can be used for indicating subgroups and/or other features described above, such as if the paging message is intended for idle or inactive UEs. In 3GPP Rel-15 these 6 bits are reserved for or defined for future use. As such these bits or fields are otherwise reserved. These bits are not used by or inspected by UEs compatible up to 3GPP Rel-15. In addition to the explicit reserved bits in the 3GPP Rel-15 paging DCI, additional bits or indications can be used for possible extensions or additional subgroups. For example, if only scheduling information is included in paging DCI, there are also eight (8) bits reserved for short messages. There are also three reserved values or indices for modulation and coding scheme (MCS), which can be repurposed for such indications. Transport block (TB) scaling field 11 is also reserved and can also be repurposed in this manner. As such, the repurposed fields or bits are reserved indices of a field of the paging DCI that is used to convey other information.

These embodiments described above can be further illustrated with reference to FIGS. 9-10, which depict exemplary methods and/or procedures performed by a network node and a UE, respectively. In other words, various features of the operations described below correspond to various embodiments described above.

Figure 9:
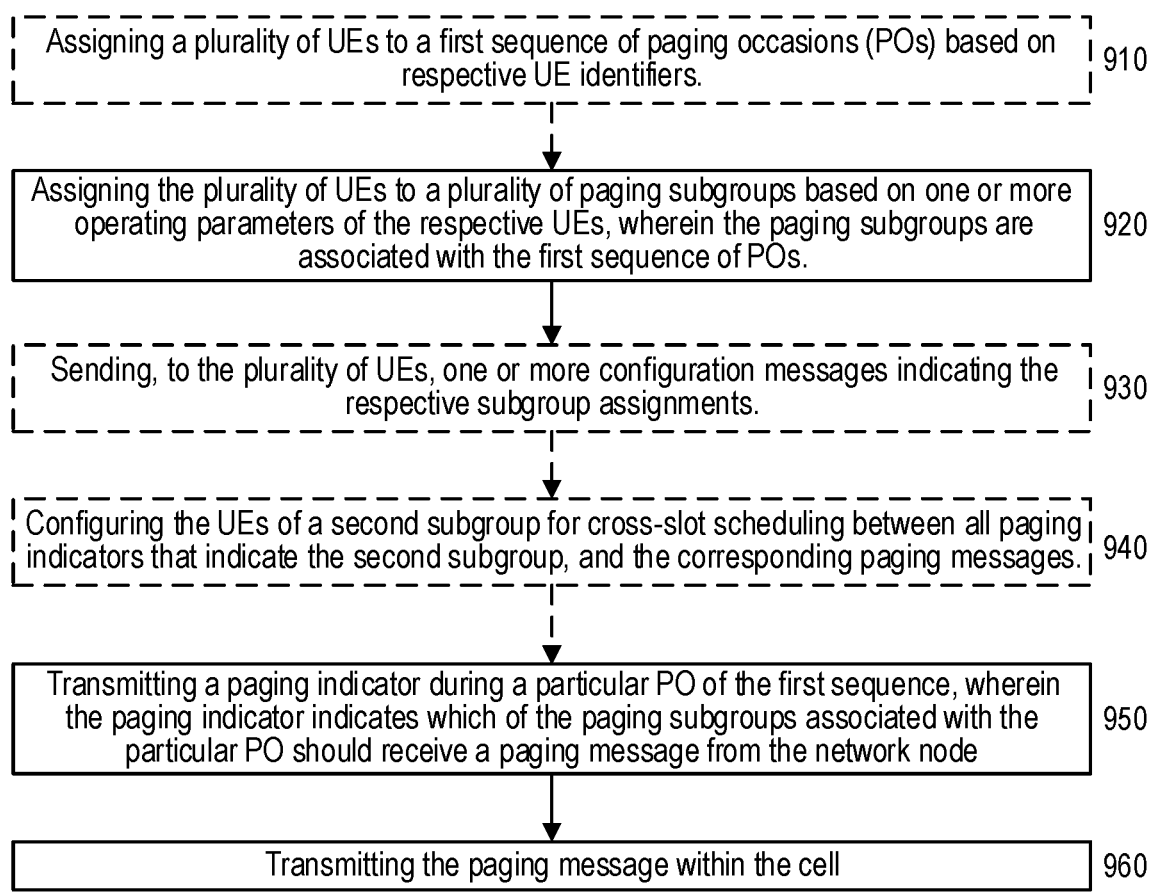
FIG. 9 shows a flow diagram of an exemplary method and/or procedure performed by a user equipment (UE, e.g., wireless device, MTC device, NB-IoT device, etc. or component thereof), according to various exemplary embodiments of the present disclosure.

More specifically, FIG. 9 shows a flow diagram of an exemplary method and/or procedure for selective paging of a plurality of user equipment (UEs) operating in a cell served by a network node in a radio access network (RAN), according to various exemplary embodiments of the present disclosure. The exemplary method and/or procedure can be performed by a network node (e.g., base station, eNB, gNB, etc., or component thereof) of the RAN (e.g., NG-RAN, E-UTRAN, etc.). Furthermore, the exemplary method and/ or procedure shown in FIG. 9 can be utilized cooperatively with other exemplary method and/or procedures described herein (e.g., FIG. 10) to provide various exemplary benefits described herein. Although FIG. 9 shows blocks in a particular order, this order is merely exemplary, and the operations of the exemplary method and/or procedure can be performed in a different order than shown and can be combined and/or divided into blocks having different functionality than shown. Optional blocks or operations are indicated by dashed lines.

In some embodiments, the exemplary method and/or procedure illustrated in FIG. 9 can include the operations of block 910, where the network node can assign the plurality of UEs to a first sequence of paging occasions (POs) based on respective UE identifiers. For example, the respective UE identifiers can be respective 5G-S-TMSI's. Put a different way, the respective 5G-S-TMSI's can be such that the plurality of UEs are all assigned to (e.g., share) the first sequence of POs.

The exemplary method and/or procedure can also include operations of block 920, where the network node can assign the plurality of UEs to a plurality of paging subgroups based on one or more operating parameters of the respective UEs. The paging subgroups are associated with the first sequence of POs to which all of the UEs are assigned. In various embodiments, the one or more operating parameters can include any of the following:
- radio resource control (RRC) states of the respective UEs;
- frequency of paging the respective UEs;
- areas in which the respective UEs are paged;
- elapsed time since a most recent communication event between the respective UEs and the network node;
- number of communication events between the respective UEs and the network node during a recent time interval; and
- respective UE discontinuous reception (DRX) cycle times.

In some embodiments, the exemplary method and/or procedure can also include operations of block 930, where the network node can send, to the plurality of UEs, one or more configuration messages indicating the respective subgroup assignments. This can be done, e.g., via RRC signaling.

The exemplary method and/or procedure can also include operations of block 950, where the network node can transmit a paging indicator during a particular PO of the first sequence. The paging indicator can indicate which of the paging subgroups associated with the particular PO should receive a paging message from the network node. In some embodiments, the paging indicator comprises a plurality of bits, with each bit indicating whether a particular subgroup should receive the paging message from the network node. The exemplary method and/or procedure can also include operations of block 960, where the network node can transmit the paging message within the cell. The paging message can be directed to UEs within the subgroups indicated by the paging indicator.

In some embodiments, the paging indicator can be transmitted in (e.g. in the contents of) a paging downlink control information (DCI) on a physical downlink control channel (PDCCH), and the paging message can be transmitted on a physical downlink shared channel (PDSCH). In some of these embodiments, the paging indicator can be transmitted in the paging DCI according to one of the following: in a field of the paging DCI that is otherwise reserved; or in reserved values of a field of the paging DCI that is used to convey other information.

Put differently, the paging indicator can be transmitted in a field that has been reserved or defined for it or for future use, or in a field that is reserved or defined for some other purpose. These fields can then be correctly interpreted by the UEs compatible with such defined usage of these fields. Whereas, an incompatible UE would not expect or not inspect these fields or field combinations. In some embodiments, the plurality of subgroups can include a first subgroup corresponding to UEs in RRC_INACTIVE state, and a second subgroup corresponding to UEs in RRC_IDLE state. In some of these embodiments, the paging indicator can indicate whether the paging message is intended only for the first subgroup (i.e., RRC_INACTIVE).

In some embodiments, the plurality of subgroups can include a first subgroup corresponding to UEs that are paged at least as frequently as a predetermined threshold, and a second subgroup corresponding to UEs that are paged less frequently than the predetermined threshold. In such embodiments, the exemplary method and/or procedure can also include the operations of block 940, where the network node can configure the UEs of the second subgroup for cross-slot scheduling between all paging indicators that indicate the second subgroup, and the corresponding paging messages. This can be done, for example, via RRC signaling. Furthermore, in such embodiments, if the paging indicator (in block 950) indicates the second subgroup, the paging message is transmitted (in block 960) during a second timeslot that is subsequent to a first timeslot that includes the particular PO.

Figure 10:
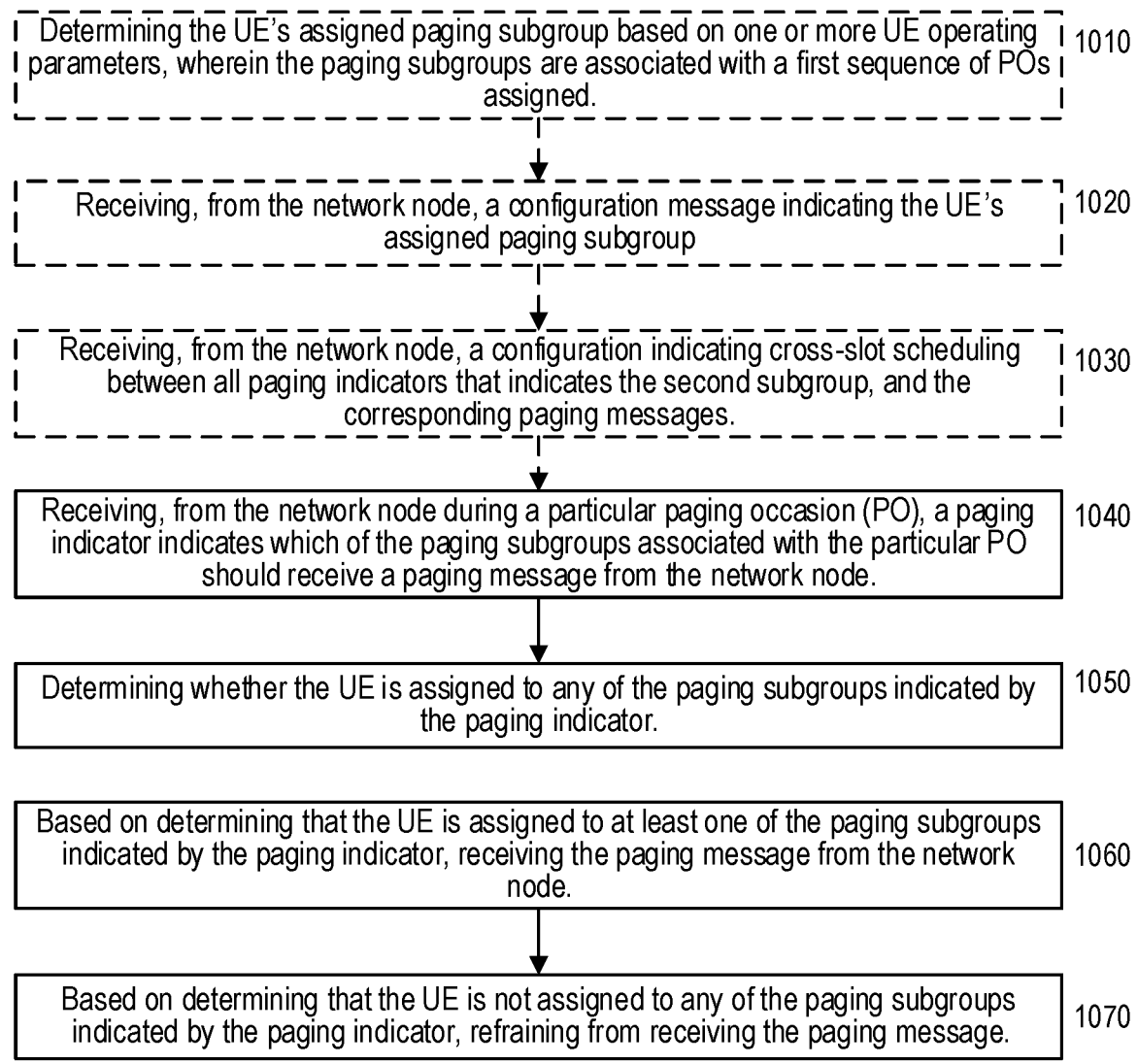
FIG. 10 shows a flow diagram of an exemplary method and/or procedure performed by a network node (e.g., base station, gNB, eNB, etc. or component thereof) in a radio access network (RAN), according to various exemplary embodiments of the present disclosure.

In addition, FIG. 10 shows a flow diagram of an exemplary method and/or procedure for receiving paging messages from a network node serving a cell in a radio access network (RAN), according to various exemplary embodiments of the present disclosure. The exemplary method and/or procedure can be performed by a user equipment (e.g., UE, wireless device, IoT device, modem, etc. or component thereof) in communication with the network node (e.g., base station, eNB, gNB, etc., or components thereof) in the RAN (e.g., NG-RAN, E-UTRAN). Furthermore, the exemplary method and/or procedure shown in FIG. 10 can be utilized cooperatively with other exemplary methods and/or procedures described herein (e.g., FIG. 9) to provide various exemplary benefits described herein. Although FIG. 10 shows blocks in a particular order, this order is merely exemplary and the operations of the exemplary method and/or procedure can be performed in a different order than shown and can be combined and/or divided into blocks having different functionality than shown. Optional blocks or operations are indicated by dashed lines.

In some embodiments, the exemplary method and/or procedure illustrated in FIG. 10 can include the operations of block 1010, where the UE can determine a paging subgroup assigned to the UE based on one or more UE operating parameters. The paging subgroups can be associated with a first sequence of paging occasions (POs) to which the UE is assigned. In various embodiments, the one or more operating parameters can include any of the following:
- radio resource control (RRC) states of the respective UEs;
- frequency of paging the respective UEs;
- areas in which the respective UEs are paged;
- elapsed time since a most recent communication event between the respective UEs and the network node;
- number of communication events between the respective UEs and the network node during a recent time interval; and
- respective UE discontinuous reception (DRX) cycle times.

In other embodiments, the exemplary method and/or procedure can include operations of block 1020, where the UE can receive, from the network node, a configuration message indicating the UE's assigned paging subgroup. This can be done, e.g., via RRC signaling.

The exemplary method and/or procedure can also include operations of block 1040, where the UE can receive, from the network node during a particular paging occasion (PO), a paging indicator that indicates which of the paging subgroups associated with the particular PO should receive a paging message from the network node. In some embodiments, the paging indicator comprises a plurality of bits, with each bit indicating whether a particular subgroup should receive the paging message from the network node.

The exemplary method and/or procedure can also include operations of block 1050, where the UE can determine whether the UE is assigned to any of the paging subgroups indicated by the paging indicator. This can be done, for example, by comparing the paging subgroups indicated by the paging indicator with one or more paging subgroup assignments previously determined by the UE (in block 1010) or configured by the network (in block 1020).

The exemplary method and/or procedure can also include operations of blocks 1060-1070. In block 1060, based on determining that the UE is assigned to at least one of the paging subgroups indicated by the paging indicator, the UE can receive the paging message from the network node. On the other hand, in block 1070, based on determining that the UE is not assigned to any of the paging subgroups indicated by the paging indicator, the UE can refrain from receiving the paging message. In such case, the UE can go to sleep after reading the paging indicator.

In some embodiments, the paging indicator can be received in (e.g. in the contents of) a paging downlink control information (DCI) on a physical downlink control channel (PDCCH), and the paging message can be transmitted on a physical downlink shared channel (PDSCH). In some of these embodiments, the paging indicator can be received in the paging DCI according to one of the following: in a field of the paging DCI that is otherwise reserved; or in reserved values of a field of the paging DCI that is used to convey other information.

Put differently, the paging indicator can be transmitted in a field that has been reserved or defined for it or for future use, or in a field that is reserved or defined for some other purpose. These fields can then be correctly interpreted by the UEs compatible with such defined usage of these fields. Whereas, an earlier, e.g. 3GPP Rel. 15, compatible UE would not expect or not inspect these fields or field combinations.

In some embodiments, the plurality of subgroups can include a first subgroup corresponding to UEs in RRC_INACTIVE state, and a second subgroup corresponding to UEs in RRC_IDLE state. In some of these embodiments, the paging indicator can indicate whether the paging message is intended only for the first subgroup (i.e., RRC_INACTIVE). As such, the operations of block 1050 can be based on the UE's current RRC state.

In some embodiments, the plurality of subgroups can include a first subgroup corresponding to UEs that are paged at least as frequently as a predetermined threshold, and a second subgroup corresponding to UEs that are paged less frequently than the predetermined threshold. In such embodiments, the exemplary method and/or procedure can also include the operations of block 1030, where the UE can receive, from the network node, a configuration indicating cross-slot scheduling between all paging indicators that indicates the second subgroup, and the corresponding paging messages. This can be done, for example, via RRC signaling. Furthermore, in such embodiments, if UE is assigned to the second subgroup and the paging indicator indicates the second subgroup, the UE can receive the paging message (in block 1060) during a second timeslot that is subsequent to a first timeslot that includes the particular PO.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 11:
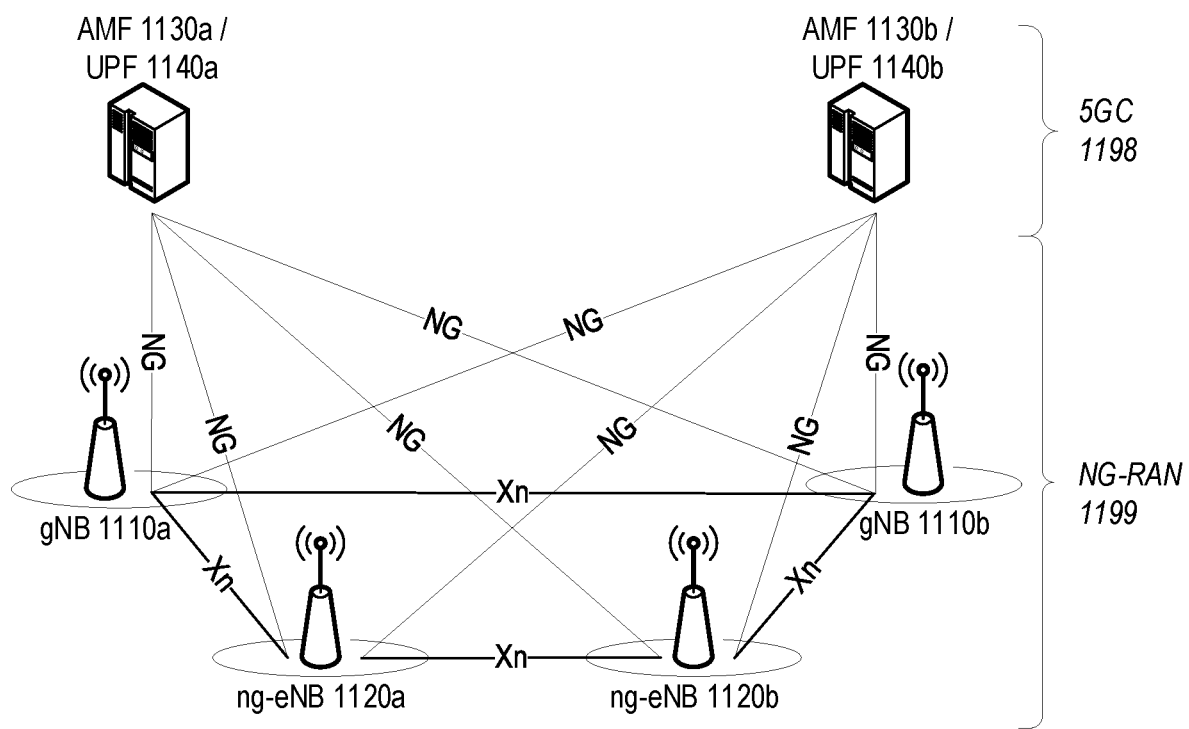
FIG. 11 shows another exemplary 5G network architecture.

FIG. 11 shows a high-level view of an exemplary 5G network architecture, including a Next Generation Radio Access Network (NG-RAN) 1199 and a 5G Core (5GC) 1198. As shown in the figure, NG-RAN 1199 can include gNBs 1110 (e.g., 1110*a,b*) and ng-eNBs 1120 (e.g., 1120*a,b*) that are interconnected with each other via respective Xn interfaces. The gNBs and ng-eNBs are also connected via the NG interfaces to 5GC 1198, more specifically to the AMF (Access and Mobility Management Function) 1130 (e.g., AMFs 1130*a,b*) via respective NG-C interfaces and to the UPF (User Plane Function) 1140 (e.g., UPFs 1140*a,b*) via respective NG-U interfaces.

NG-RAN 1199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. If security protection for CP and UP data on TNL of NG-RAN interfaces is supported, NDS/IP can be applied.

Each of the gNBs 1110*a,b* can support the NR radio interface, including frequency division duplexing (FDD), time division duplexing (TDD), or a combination thereof. In contrast, each of ng-eNBs 1120*a,b* supports the LTE radio interface but, unlike conventional LTE eNBs (e.g., eNBs 115-115 shown in FIG. 1), connect to the 5GC via the NG interface. In addition, the gNBs 1110*a,b* and ng-eNBs 1120*a,b* can provide multi-RAT (radio access technology) dual connectivity (MR-DC) to UEs.

Figure 12:
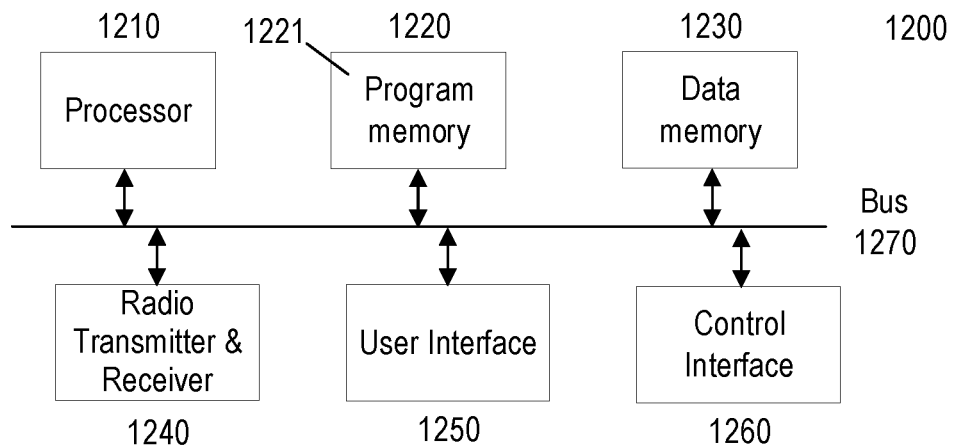
FIG. 12 is a block diagram of an exemplary wireless device or UE according to various exemplary embodiments.

FIG. 12 shows a block diagram of an exemplary wireless device or user equipment (UE) 1200 configurable according to various exemplary embodiments of the present disclosure, including execution of instructions on a computer-readable medium that correspond to operations of one or more exemplary methods and/or procedures described herein above.

Exemplary device 1200 can comprise a processor 1210 that can be operably connected to a program memory 1220 and/or a data memory 1230 via a bus 1270 that can comprise parallel address and data buses, serial ports, or other methods and/or structures known to those of ordinary skill in the art. Program memory 1220 can store software code, programs, and/or instructions (collectively shown as computer program product 1221 in FIG. 12) executed by processor 1210 that can configure and/or facilitate device 1200 to perform various operations, including exemplary methods and/or procedures described herein.

More generally, program memory 1220 can store software code or program executed by processor 1210 that facilitates, causes and/or programs exemplary device 1200 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.12 WiFi, HDMI, USB, Firewire, etc., or any other current or future protocols that can be utilized in conjunction with radio transceiver or communication circuitry 1240, user interface 1250, and/or host interface 1260.

More specifically, processor 1210 can execute program code stored in program memory 1220 that corresponds to MAC, RLC, PDCP, and RRC layer protocols standardized by 3GPP (e.g., for NR and/or LTE). As a further example, processor 1210 can execute program code stored in program memory 1220 that, together with radio transceiver 1240, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1220 can also store software code executed by processor 1210 to control the functions of device 1200, including configuring and controlling various components such as radio transceiver 1240, user interface 1250, and/or host interface 1260. Program memory 1220 can also store one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition or as an alternative, program memory 1220 can comprise an external storage arrangement (not shown) remote from device 1200, from which the instructions can be downloaded into program memory 1220 located within or removably coupled to device 1200, so as to enable execution of such instructions.

Data memory 1230 can comprise memory area for processor 1210 to store variables used in protocols, configuration, control, and other functions of device 1200, including operations corresponding to, or comprising, any of the exemplary methods and/or procedures described herein. Moreover, program memory 1220 and/or data memory 1230 can comprise non-volatile memory (e.g., flash memory), volatile memory (e.g., static or dynamic RAM), or a combination thereof. Furthermore, data memory 1230 can comprise a memory slot by which removable memory cards in one or more formats (e.g., SD Card, Memory Stick, Compact Flash, etc.) can be inserted and removed. Persons of ordinary skill in the art will recognize that processor 1210 can comprise multiple individual processors (including, e.g., multi-core processors), each of which implements a portion of the functionality described above. In such cases, multiple individual processors can be commonly connected to program memory 1220 and data memory 1230 or individually connected to multiple individual program memories and or data memories. More generally, persons of ordinary skill in the art will recognize that various protocols and other functions of device 1200 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1240 can comprise radio-frequency transmitter and/or receiver functionality that facilitates the device 1200 to communicate with other equipment supporting like wireless communication standards and/or protocols. In some exemplary embodiments, the radio transceiver 1240 includes a transmitter and a receiver that enable device 1200 to communicate with various 5G/NR networks according to various protocols and/or methods proposed for standardization by 3GPP and/or other standards bodies. For example, such functionality can operate cooperatively with processor 1210 to implement a PHY layer based on OFDM, OFDMA, and/or SC-FDMA technologies, such as described herein with respect to other figures.

In some exemplary embodiments, the radio transceiver 1240 includes an LTE transmitter and receiver that can facilitate the device 1200 to communicate with various LTE LTE-Advanced (LTE-A), and/or NR networks according to standards promulgated by 3GPP. In some exemplary embodiments of the present disclosure, the radio transceiver 1240 includes circuitry, firmware, etc. necessary for the device 1200 to communicate with various 5G/NR, LTE, LTE-A, UMTS, and/or GSM/EDGE networks, also according to 3GPP standards. In some exemplary embodiments of the present disclosure, radio transceiver 1240 includes circuitry, firmware, etc. necessary for the device 1200 to communicate with various CDMA2000 networks, according to 3GPP2 standards.

In some exemplary embodiments of the present disclosure, the radio transceiver 1240 is capable of communicating using radio technologies that operate in unlicensed frequency bands, such as IEEE 802.11 WiFi that operates using frequencies in the regions of 2.4, 5, and/or 120 GHz. In some exemplary embodiments of the present disclosure, radio transceiver 1240 can comprise a transceiver that is capable of wired communication, such as by using IEEE 802.3 Ethernet technology. The functionality particular to each of these embodiments can be coupled with or controlled by other circuitry in the device 1200, such as the processor 1210 executing program code stored in program memory 1220 in conjunction with, or supported by, data memory 1230.

User interface 1250 can take various forms depending on the particular embodiment of device 1200, or can be absent from device 1200 entirely. In some exemplary embodiments, user interface 1250 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, the device 1200 can comprise a tablet computing device including a larger touchscreen display. In such embodiments, one or more of the mechanical features of the user interface 1250 can be replaced by comparable or functionally equivalent virtual user interface features (e.g., virtual keypad, virtual buttons, etc.) implemented using the touchscreen display, as familiar to persons of ordinary skill in the art. In other embodiments, the device 1200 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display.

A control interface 1260 of the device 1200 can take various forms depending on the particular exemplary embodiment of device 1200 and of the particular interface requirements of other devices that the device 1200 is intended to communicate with and/or control. For example, the control interface 1260 can comprise an RS-232 interface, an RS-485 interface, a USB interface, an HDMI interface, a Bluetooth interface, an I$^2$C interface, a PCMCIA interface, or the like. In some exemplary embodiments of the present disclosure, control interface 1260 can comprise an IEEE 802.3 Ethernet interface such as described above. In some exemplary embodiments of the present disclosure, the control interface 1260 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1200 can comprise more functionality than is shown in FIG. 12 including, for example, a video and/or still-image camera, microphone, media player and/or recorder, etc. Moreover, radio transceiver 1240 can include circuitry necessary to communicate using additional radio-frequency communication standards including Bluetooth, GPS, and/or others. Moreover, the processor 1210 can execute software code stored in the program memory 1220 to control such additional functionality. For example, directional velocity and/or position estimates output from a GPS receiver can be available to any application program executing on the device 1200, including various exemplary methods and/or computer-readable media according to various exemplary embodiments of the present disclosure.

Figure 13:
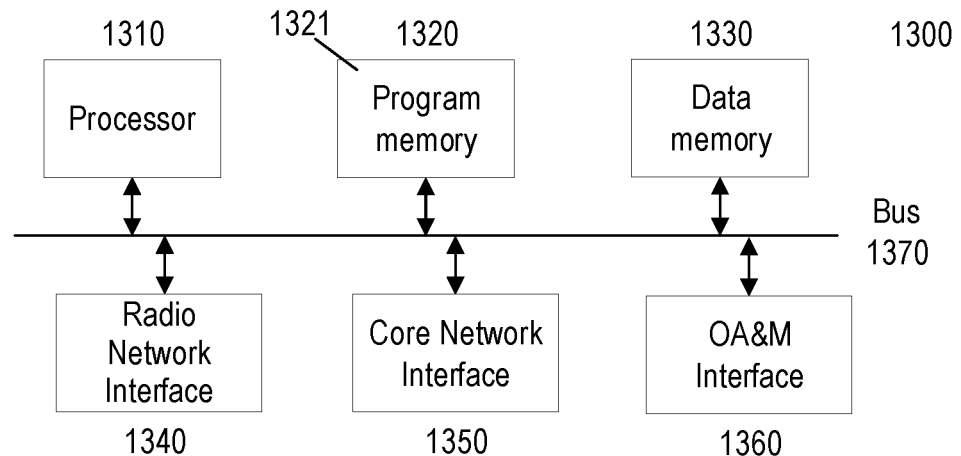
FIG. 13 is a block diagram of an exemplary network node according to various exemplary embodiments.

FIG. 13 shows a block diagram of an exemplary network node 1300 configurable according to various embodiments of the present disclosure, including those described above with reference to other figures. In some exemplary embodiments, network node 1300 can comprise a base station, eNB, gNB, or component thereof. Network node 1300 comprises processor 1310 which is operably connected to program memory 1320 and data memory 1320 via bus 1370, which can comprise parallel address and data buses, serial ports, or other methods and/or structures known to those of ordinary skill in the art.

Program memory 1320 can store software code, programs, and/or instructions (collectively shown as computer program product 1321 in FIG. 13) executed by processor 1310 that can configure and/or facilitate network node 1300 to communicate with one or more other devices using protocols according to various embodiments of the present disclosure, including one or more exemplary methods and/or procedures discussed above. Program memory 1320 can also store software code executed by processor 1310 that can facilitate and specifically configure network node 1300 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1340 and core network interface 1350. Program memory 1320 can also store software code executed by processor 1310 to control the functions of network node 1300, including configuring and controlling various components such as radio network interface 1340 and core network interface 1350.

Data memory 1320 can comprise memory area for processor 1310 to store variables used in protocols, configuration, control, and other functions of network node 1300. As such, program memory 1320 and data memory 1320 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can comprise multiple individual processors (not shown), each of which implements a portion of the functionality described above. In such case, multiple individual processors may be commonly connected to program memory 1320 and data memory 1320 or individually connected to multiple individual program memories and/or data memories. More generally, persons of ordinary skill in the art will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1340. According to further exemplary embodiments of the present disclosure, the radio network interface 1340 can comprise a PHY layer based on OFDM, OFDMA, and/or SC-FDMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some exemplary embodiments, core network interface 1350 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

By way of example and without limitation, core network interface 1350 can comprise one or more of the S1, S1-U, and NG interfaces standardized by 3GPP. Also by way of example, radio network interface 1340 can comprise the Uu interface standardized by 3GPP.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
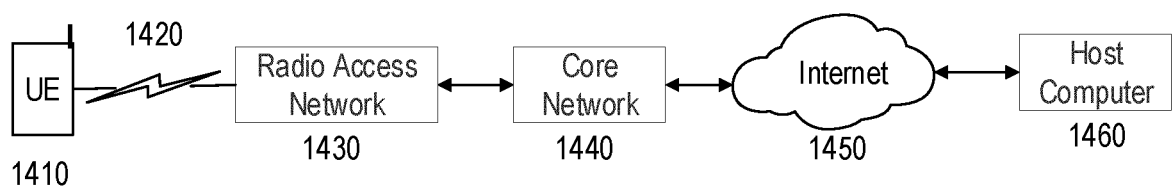
FIG. 14 is a block diagram of an exemplary network configured to provide over-the-top (OTT) data services between a host computer and a UE, according to various exemplary embodiments.

FIG. 14 is a block diagram of an exemplary network configuration usable to provide over-the-top (OTT) data services between a host computer and a user equipment (UE), according to one or more exemplary embodiments of the present disclosure. UE 1410 can communicate with radio access network (RAN) 1430 over radio interface 1420, which can be based on protocols described above including, e.g., LTE, LTE-A, and 5G/NR. RAN 1430 can include one or more network nodes (e.g., base stations, eNBs, gNBs, ng-eNBs, en-gNBs, controllers, etc.). RAN 1430 can further communicate with core network 1440 according to various protocols and interfaces described above. For example, one or more apparatus (e.g., base stations, eNBs, gNBs, etc.) comprising RAN 1430 can communicate to core network 1440 via core network interface 1450 described above. In some exemplary embodiments, RAN 1430 and core network 1440 can be configured and/or arranged as shown in other figures discussed above. Similarly, UE 1410 can also be configured and/or arranged as shown in other figures discussed above.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some exemplary embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 14 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1430 to page UEs—such as UE 1410—in a manner that reduces the UE power consumption for monitoring a PDSCH for paging messages. When used in NR and/or LTE UEs (e.g., UE 1410) and eNBs and/or gNBs (e.g., comprising RAN 1430), exemplary embodiments described herein can reduce UE power consumption for paging-related operations, thereby facilitating such UEs to use their stored energy capacity (e.g., in a battery) for other operations, such as receiving and/or transmitting data via OTT services. Such improvements can result in increased use of such OTT services with less need to recharge UE batteries.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or to electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method, performed by a network node in a radio access network (RAN), for selective paging of a plurality of user equipment (UEs) operating in a cell served by the network node, the method comprising:
    assigning the plurality of UEs to a plurality of paging subgroups based on one or more operating parameters of the respective UEs, wherein the paging subgroups are associated with a first sequence of paging occasions (POs) to which all of the UEs are assigned;
    transmitting a paging indicator during a particular PO of the first sequence, wherein the paging indicator indicates which of the paging subgroups associated with the particular PO should receive a paging message from the network node; and
    transmitting the paging message within the cell.
2. The method of embodiment 1, wherein:
    the paging indicator is transmitted in a paging downlink control information (DCI) on a physical downlink control channel (PDCCH); and
    the paging message is transmitted on a physical downlink shared channel (PDSCH).
3. The method of embodiment 2, wherein the paging indicator is transmitted in the paging DCI according to one of the following:
    in a field of the paging DCI that is otherwise reserved; or
    in reserved values of a field of the paging DCI that is used to convey other information.
4. The method of any of embodiment 1-3, wherein the paging indicator comprises a plurality of bits, each bit indicating whether a particular subgroup should receive the paging message from the network node.
5. The method of any of embodiments 1-4, wherein the one or more operating parameters include any of the following:
    radio resource control (RRC) states of the respective UEs;
    frequency of paging the respective UEs;
    areas in which the respective UEs are paged;
    elapsed time since a most recent communication event between the respective UEs and the network node;
    number of communication events between the respective UEs and the network node during a recent time interval; and
    respective UE discontinuous reception (DRX) cycle times.
6. The method of any of embodiments 1-5, wherein the plurality of subgroups includes:
    a first subgroup corresponding to UEs in RRC_INACTIVE state; and
    a second subgroup corresponding to UEs in RRC_IDLE state.
7. The method of embodiment 6, wherein the paging indicator indicates whether the paging message is intended only for the first subgroup.
8. The method of any of embodiments 1-5, wherein the plurality of subgroups includes:
    a first subgroup corresponding to UEs that are paged at least as frequently as a predetermined threshold; and
    a second subgroup corresponding to UEs that are paged less frequently than the predetermined threshold.
9. The method of embodiment 8, further comprising configuring the UEs of the second subgroup for cross-slot scheduling between all paging indicators that indicate the second subgroup, and the corresponding paging messages.
10. The method of any of embodiments 8-9, wherein if the paging indicator indicates the second subgroup, the paging message is transmitted during a second timeslot that is subsequent to a first timeslot that includes the particular PO.
11. The method of any of embodiments 1-10, further comprising sending, to the plurality of UEs, one or more configuration messages indicating the respective subgroup assignments.
12. The method of any of embodiments 1-11, further comprising assigning the plurality of UEs to the first sequence of POs based on respective UE identifiers.
13. A method, performed by a user equipment (UEs), for receiving paging messages from a network node serving a cell in a radio access network (RAN), the method comprising:
    receiving, from the network node during a particular paging occasion (PO), a paging indicator that indicates which of the paging subgroups associated with the particular PO should receive a paging message from the network node;
    determining whether the UE is assigned to any of the paging subgroups indicated by the paging indicator;
    based on determining that the UE is assigned to at least one of the paging subgroups indicated by the paging indicator, receiving the paging message from the network node; and
    based on determining that the UE is not assigned to any of the paging subgroups indicated by the paging indicator, refraining from receiving the paging message.
14. The method of embodiment 13, wherein:
    the paging indicator is received in a paging downlink control information (DCI) on a physical downlink control channel (PDCCH); and
    the paging message is received on a physical downlink shared channel (PDSCH).
15. The method of embodiment 14, wherein the paging indicator is received in the paging DCI according to one of the following:
    in a field of the paging DCI that is otherwise reserved; or
    in reserved values of a field of the paging DCI that is used to convey other information.
16. The method of any of embodiment 13-15, wherein the paging indicator comprises a plurality of bits, each bit indicating whether a particular subgroup should receive the paging message from the network node.

17. The method of any of embodiments 13-16, wherein the one or more operating parameters include any of the following:
radio resource control (RRC) states of the respective UEs;
frequency of paging the respective UEs;
areas in which the respective UEs are paged;
elapsed time since a most recent communication event between the respective UEs and the network node;
number of communication events between the respective UEs and the network node during a recent time interval; and
respective UE discontinuous reception (DRX) cycle times.

18. The method of any of embodiments 13-17, wherein the plurality of subgroups includes:
a first subgroup corresponding to UEs in RRC_INACTIVE state; and
a second subgroup corresponding to UEs in RRC_IDLE state.

19. The method of embodiment 6, wherein the paging indicator indicates whether the paging message is intended only for the first subgroup.

20. The method of any of embodiments 13-17, wherein the plurality of subgroups includes:
a first subgroup corresponding to UEs that are paged at least as frequently as a predetermined threshold; and
a second subgroup corresponding to UEs that are paged less frequently than the predetermined threshold.

21. The method of embodiment 20, further comprising receiving, from the network node, a configuration indicating cross-slot scheduling between all paging indicators that indicates the second subgroup, and the corresponding paging messages.

22. The method of any of embodiments 20-21, wherein if UE is assigned to the second subgroup and the paging indicator indicates the second subgroup, the UE receives the paging message during a second timeslot that is subsequent to a first timeslot that includes the particular PO.

23. The method of any of embodiments 13-22, further comprising determining the UE's assigned paging subgroup based on one or more UE operating parameters.

24. The method of any of embodiments 13-22, further comprising receiving, from the network node, a configuration message indicating the UE's assigned paging subgroup.

25. A network node, in a radio access network (RAN), configured for selective paging of a plurality of user equipment (UEs) operating in a cell served by the network node, the network node comprising:
radio network interface circuitry configured to communicate with the plurality of UEs; and
processing circuitry operatively associated with the radio network interface, whereby the processing circuitry and the radio network interface circuitry are configured to perform operations corresponding to any of the methods of embodiments 1-12.

26. A network node, in a radio access network (RAN), configured for selective paging of a plurality of user equipment (UEs) operating in a cell served by the network node, the network node being further arranged to perform operations corresponding to any of the methods of embodiments 1-12.

27. A non-transitory, computer-readable medium storing computer-executable instructions that, when executed by processing circuitry of a network node in a radio access network (RAN), configure the network node to perform operations corresponding to the methods of any of embodiments 1-12.

28. A computer program product comprising computer-executable instructions that, when executed by processing circuitry of a network node in a radio access network (RAN), configure the network node to perform operations corresponding to the methods of any of embodiments 1-12.

29. A user equipment (UE) configured to receive paging messages from a network node serving a cell in a radio access network (RAN), the UE comprising:
communication circuitry configured to communicate with the network node; and
processing circuitry operatively associated with the communication circuitry and configured to perform operations corresponding to any of the methods of embodiments 13-24.

30. A user equipment (UE) configured to receive paging messages from a network node serving a cell in a radio access network (RAN), the UE being further arranged to perform operations corresponding to any of the methods of embodiments 13-24.

31. A non-transitory, computer-readable medium storing computer-executable instructions that, when executed by processing circuitry of a user equipment (UE), configure the UE to perform operations corresponding to the methods of any of embodiments 13-24.

32. A computer program product comprising computer-executable instructions that, when executed by processing circuitry of a user equipment (UE), configure the UE to perform operations corresponding to the methods of any of embodiments 13-24.

The invention claimed is:

1. A method, performed by a network node in a radio access network (RAN), for selective paging of a plurality of user equipment (UEs) operating in a cell served by the network node, the method comprising:
assigning the plurality of UEs to a plurality of paging subgroups based on one or more operating parameters of the respective UEs, wherein the paging subgroups are associated with a first sequence of paging occasions (POs) to which all of the UEs are assigned;
transmitting a paging indicator in downlink control information (DCI) on a physical downlink control channel (PDCCH), wherein the paging indicator indicates which of the plurality of paging subgroups associated with a PO of the first sequence should receive a paging message from the network node; and
transmitting the paging message within the cell on a physical downlink shared channel PDSCH).

2. The method of claim 1, wherein:
the paging indicator is transmitted during the PO of the first sequence.

3. The method of claim 1, wherein the DCI is a paging DCI, and the paging indicator is transmitted in the paging DCI according to one of the following:
in a field of the paging DCI that is otherwise reserved; or
in reserved values of a field of the paging DCI that is used to convey other information.

4. The method of claim 1, wherein the paging indicator comprises a plurality of bits, each bit indicating whether a particular subgroup should receive the paging message from the network node.

5. The method of claim 1, wherein the one or more operating parameters include any of the following:
radio resource control (RRC) states of the respective UEs;
frequency of paging the respective UEs;
areas in which the respective UEs are paged;
elapsed time since a most recent communication event between the respective UEs and the network node;

number of communication events between the respective UEs and the network node during a recent time interval; and respective UE discontinuous reception (DRX) cycle times.

6. The method of claim 1, wherein:

the plurality of subgroups includes a first subgroup corresponding to UEs in RRC_INACTIVE state and a second subgroup corresponding to UEs in RRC_IDLE state; and the paging indicator indicates whether the paging message is intended only for the first subgroup.

7. The method of claim 1, wherein the plurality of subgroups includes:

a first subgroup corresponding to UEs that are paged at least as frequently as a predetermined threshold; and a second subgroup corresponding to UEs that are paged less frequently than the predetermined threshold.

8. The method of claim 7, further comprising configuring the UEs of the second subgroup for cross-slot scheduling between all paging indicators that indicate the second subgroup, and the corresponding paging messages.

9. The method of claim 7, wherein when the paging indicator indicates the second subgroup, the paging message is transmitted during a second timeslot that is subsequent to a first timeslot that includes the PO.

10. The method of claim 1, further comprising one of more of the following:

sending, to the plurality of UEs, one or more configuration messages indicating the respective subgroup assignments; and assigning the plurality of UEs to the first sequence of POs based on respective UE identifiers.

11. A method, performed by a user equipment (UE), for receiving paging messages from a network node serving a cell in a radio access network (RAN), the method comprising:

receiving a paging indicator from the network node in downlink control information (DCI) on a physical downlink control channel (PDCCH), wherein:

the paging indicator indicates which of a plurality of paging subgroups associated with a paging occasion (PO) should receive a paging message from the network node, and the PO is one of a first sequence of POs to which UEs from all of the paging subgroups are assigned;

when the UE is assigned to at least one of the paging subgroups indicated by the paging indicator, receiving the paging message from the network node on a physical downlink shared channel (PDSCH).

12. The method of claim 11, wherein:

the paging indicator is received during the PO of the first sequence.

13. The method of claim 11, wherein the DCI is a paging DCI, and the paging indicator is received in the paging DCI according to one of the following:

in a field of the paging DCI that is otherwise reserved; or in reserved values of a field of the paging DCI that is used to convey other information.

14. The method of claim 11, wherein the paging indicator comprises a plurality of bits, each bit indicating whether a particular subgroup should receive the paging message from the network node.

15. The method of claim 11, wherein the one or more operating parameters include any of the following:

radio resource control (RRC) states of the respective UEs; frequency of paging the respective UEs;

areas in which the respective UEs are paged;

elapsed time since a most recent communication event between the respective UEs and the network node;

number of communication events between the respective UEs and the network node during a recent time interval; and respective UE discontinuous reception (DRX) cycle times.

16. The method of claim 11, wherein:

the plurality of subgroups includes a first subgroup corresponding to UEs in RRC_INACTIVE state and a second subgroup corresponding to UEs in RRC_IDLE state; and the paging indicator indicates whether the paging message is intended only for the first subgroup.

17. The method of claim 11, wherein the plurality of subgroups includes:

a first subgroup corresponding to UEs that are paged at least as frequently as a predetermined threshold; and a second subgroup corresponding to UEs that are paged less frequently than the predetermined threshold.

18. The method of claim 17, further comprising receiving, from the network node, a configuration indicating cross-slot scheduling between all paging indicators that indicates the second subgroup, and the corresponding paging messages.

19. The method of claim 17, wherein when UE is assigned to the second subgroup and the paging indicator indicates the second subgroup, the UE receives the paging message during a second timeslot that is subsequent to a first timeslot that includes the PO.

20. The method of claim 11, further comprising one of the following:

determining the UE's assigned paging subgroup based on one or more UE operating parameters; or receiving, from the network node, a configuration message indicating the UE's assigned paging subgroup.

21. A network node, in a radio access network (RAN), configured for selective paging of a plurality of user equipment (UEs) operating in a cell served by the network node, the network node comprising:

radio network interface circuitry configured to communicate with the plurality of UEs; and processing circuitry operatively associated with the radio network interface, whereby the processing circuitry and the radio network interface circuitry are configured to perform operations corresponding to the method of claim 1.

22. A user equipment (UE) configured to receive paging messages from a network node serving a cell in a radio access network (RAN), the UE comprising:

communication circuitry configured to communicate with the network node; and processing circuitry operatively associated with the communication circuitry and configured to:

receive a paging indicator from the network node in downlink control information (DCI) on a physical downlink control channel (PDCCH), wherein:

the paging indicator indicates which of a plurality of paging subgroups associated with a paging occasion (PO) should receive a paging message from the network node, and the PO is one of a first sequence of POs to which UEs from all of the paging subgroups are assigned;

when the UE is assigned to at least one of the paging subgroups indicated by the paging indicator, receive the paging message from the network node on a physical downlink shared channel (PDSCH).

\* \* \* \* \*